United States Patent
Le et al.

(10) Patent No.: US 7,453,479 B2
(45) Date of Patent: Nov. 18, 2008

(54) IMAGE DATA DISPLAYING SYSTEM AND METHOD

(75) Inventors: Hao Le, Seoul (KR); Kwang Soon Moon, Seoul (KR); Tomoyuki Okamura, Tokyo (JP)

(73) Assignee: Innotive Corporation, Seoul (KR)

( * ) Notice: Subject to any disclaimer, the term of this patent is extended or adjusted under 35 U.S.C. 154(b) by 1064 days.

(21) Appl. No.: 10/110,680

(22) PCT Filed: Jul. 10, 2001

(86) PCT No.: PCT/JP01/05967

§ 371 (c)(1),
(2), (4) Date: Jul. 16, 2002

(87) PCT Pub. No.: WO02/15162

PCT Pub. Date: Feb. 21, 2002

(65) Prior Publication Data

US 2002/0191867 A1    Dec. 19, 2002

(30) Foreign Application Priority Data

| Aug. 17, 2000 | (KR) | .................. 2000-47344 |
| Aug. 17, 2000 | (KR) | .................. 2000-47345 |
| Oct. 11, 2000 | (KR) | .................. 2000-59645 |
| Feb. 27, 2001 | (JP) | .................. 2001-52828 |

(51) Int. Cl.
*G09G 5/02* (2006.01)

(52) U.S. Cl. ............... 345/698; 345/204; 345/212; 345/214; 345/699

(58) Field of Classification Search ............. 345/1.1–9, 345/204–215, 629–641, 427–428, 660, 667–671, 345/690–699

See application file for complete search history.

(56) References Cited

U.S. PATENT DOCUMENTS

| 4,941,193 | A | * | 7/1990 | Barnsley et al. ............. 382/249 |
| 5,574,836 | A |   | 11/1996 | Broemmelsiek ............ 345/427 |
| 6,023,266 | A |   | 2/2000 | Eglit et al. .................. 345/202 |
| 6,115,045 | A | * | 9/2000 | Miyauchi .................... 345/418 |
| 6,894,686 | B2| * | 5/2005 | Stamper et al. ............. 345/419 |
| 2002/0057850 | A1 | * | 5/2002 | Sirohey et al. ............. 382/299 |
| 2005/0144134 | A1 | * | 6/2005 | Hirano ....................... 705/51 |
| 2005/0237380 | A1 | * | 10/2005 | Kakii et al. ............... 348/14.12 |

FOREIGN PATENT DOCUMENTS

| EP | 0 881 563  | 12/1998 |
| EP | 0 933 694  | 8/1999  |
| GB | 2 287 627  | 9/1995  |
| JP | 11-203308  | 7/1999  |
| WO | 97/39437   | 10/1997 |
| WO | 00/00893   | 1/2000  |

* cited by examiner

*Primary Examiner*—Vijay Shankar
(74) *Attorney, Agent, or Firm*—Ked & Associates, LLP

(57) ABSTRACT

The system for displaying huge images in accordance with the present invention comprises: a storage device (1) for storing image data winch is divided in either one of the row direction and the column direction and contains at least two subdivided blocks; a first temporary storage device (9) for sequentially reading out data stored in the storage device (1), temporarily storing data as read and, when the data reaches a predetermined unit of data size, outputting all the data as input. And the present invention serves to improve the processing speed of huge images by bypassing the main storage device (3) during the processing operation of image data.

16 Claims, 28 Drawing Sheets

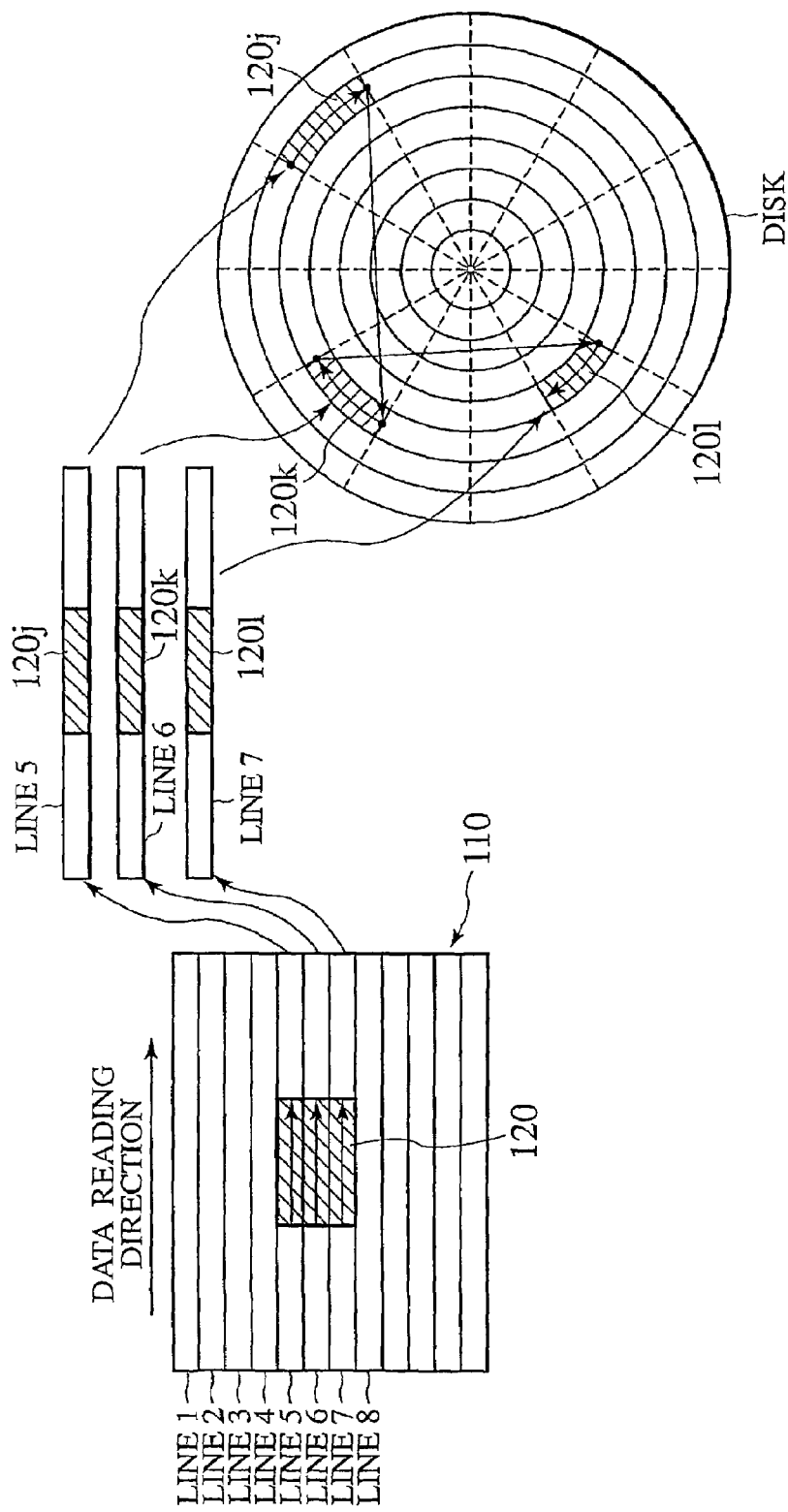

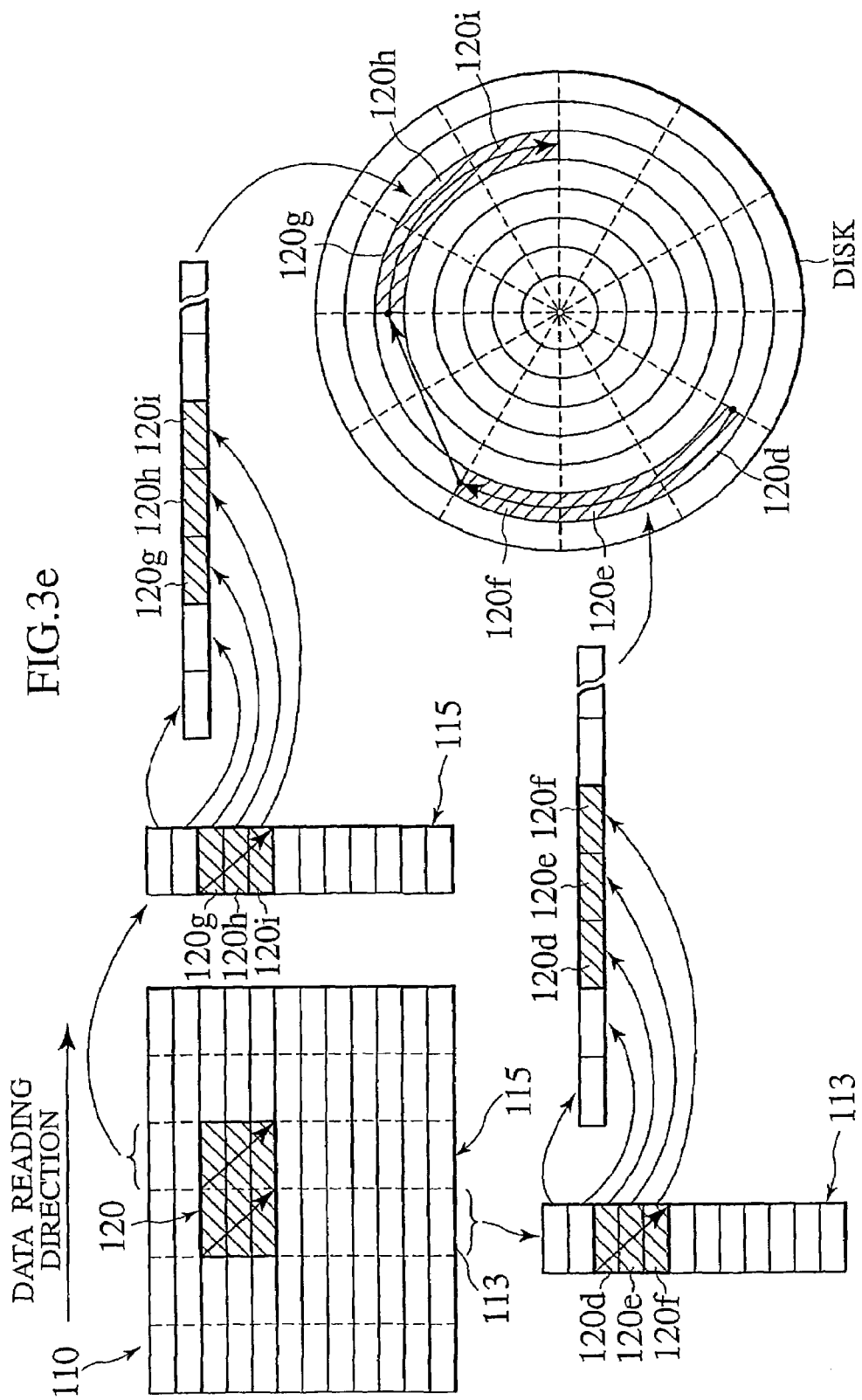

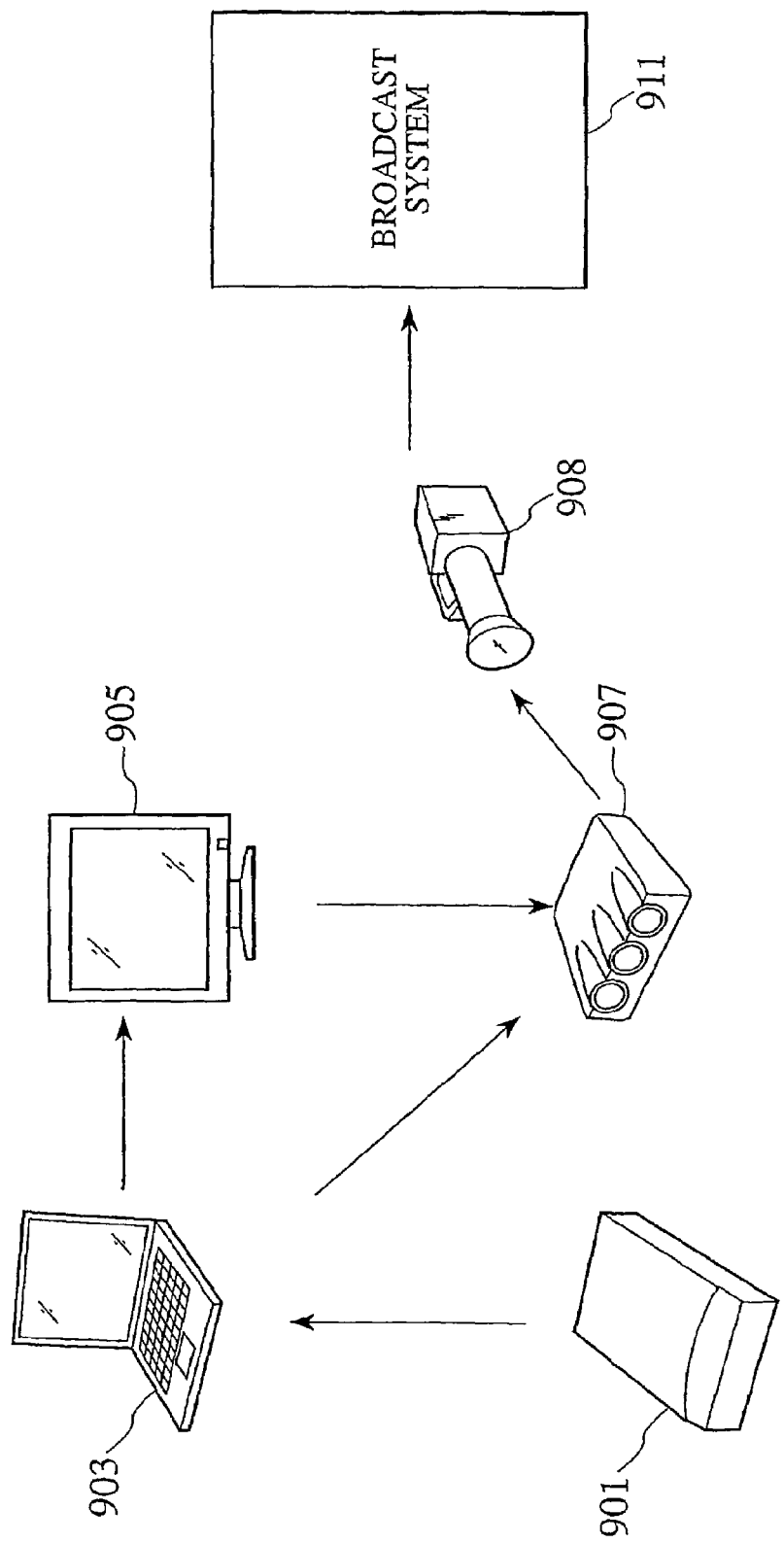

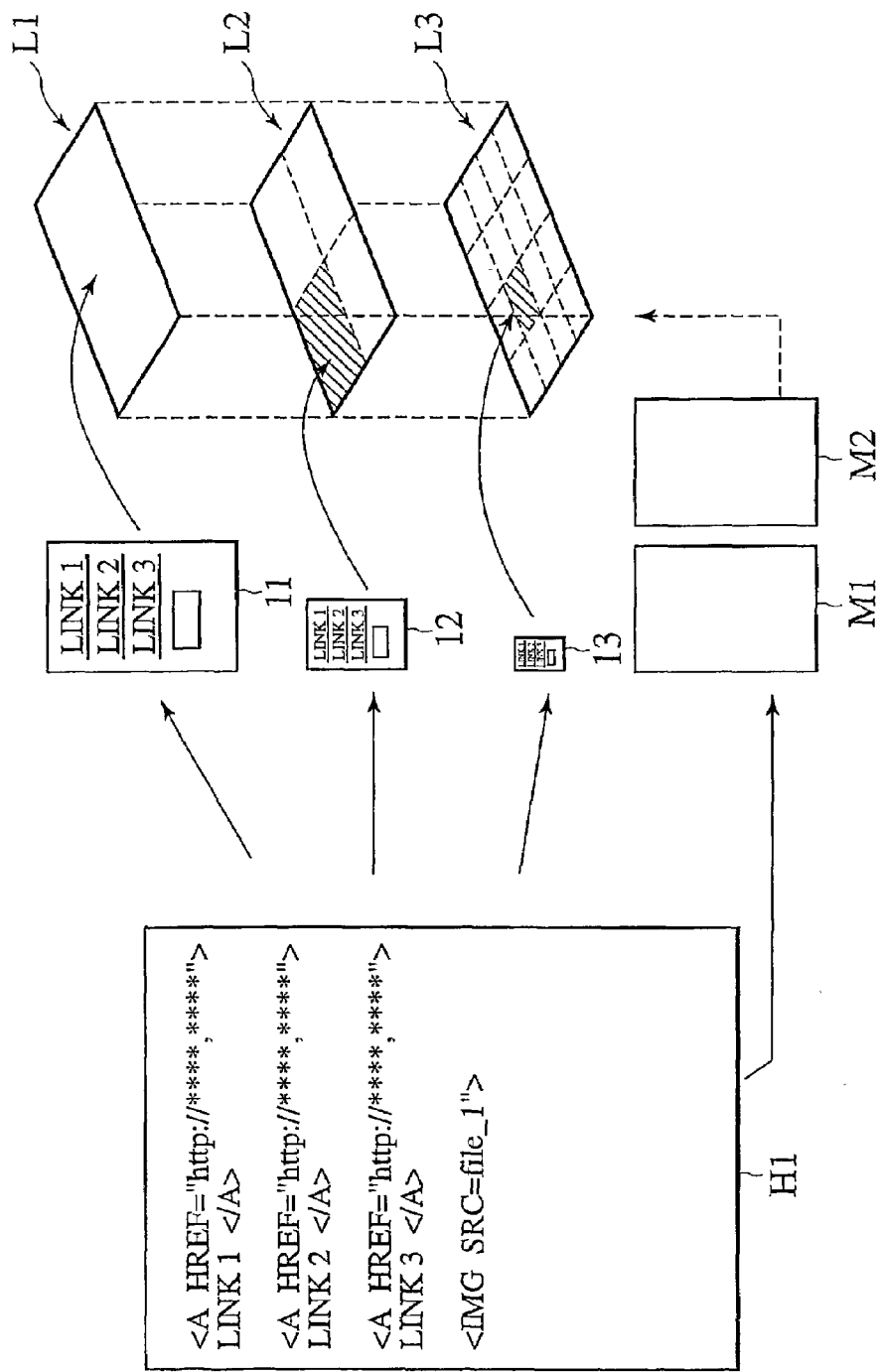

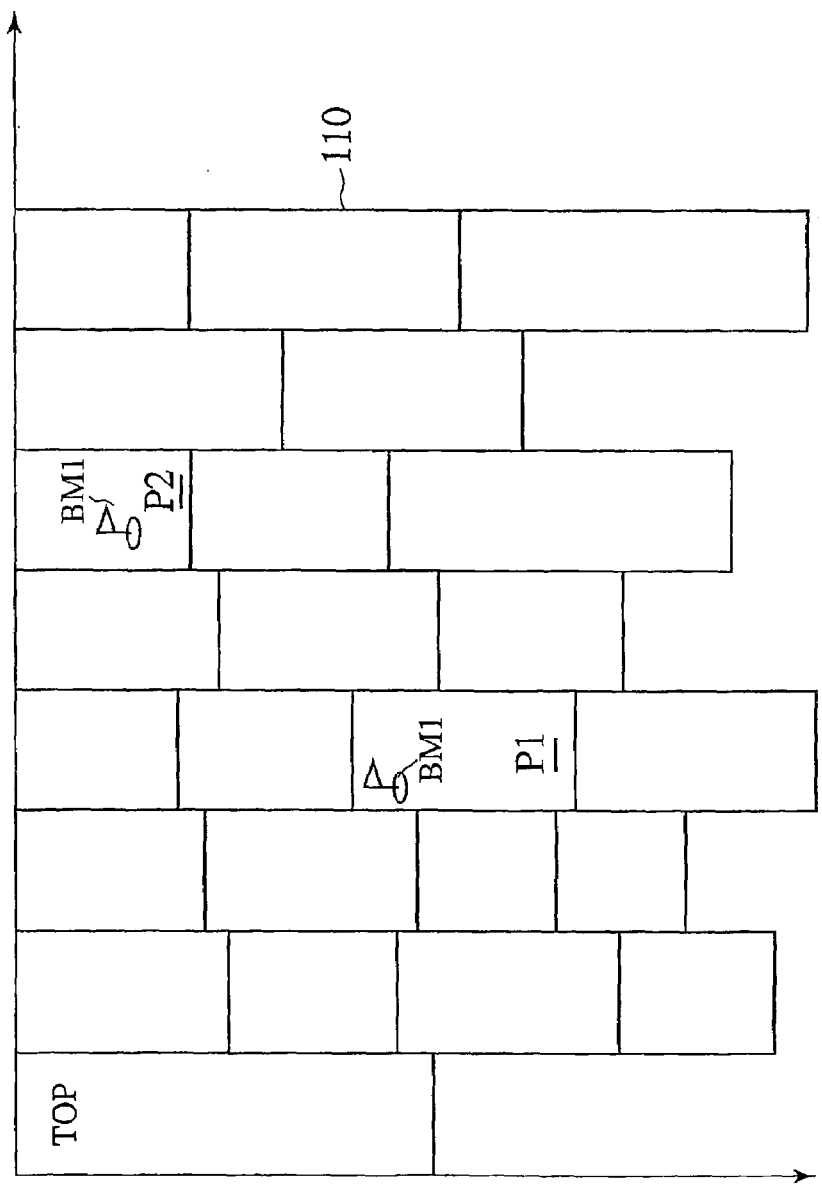

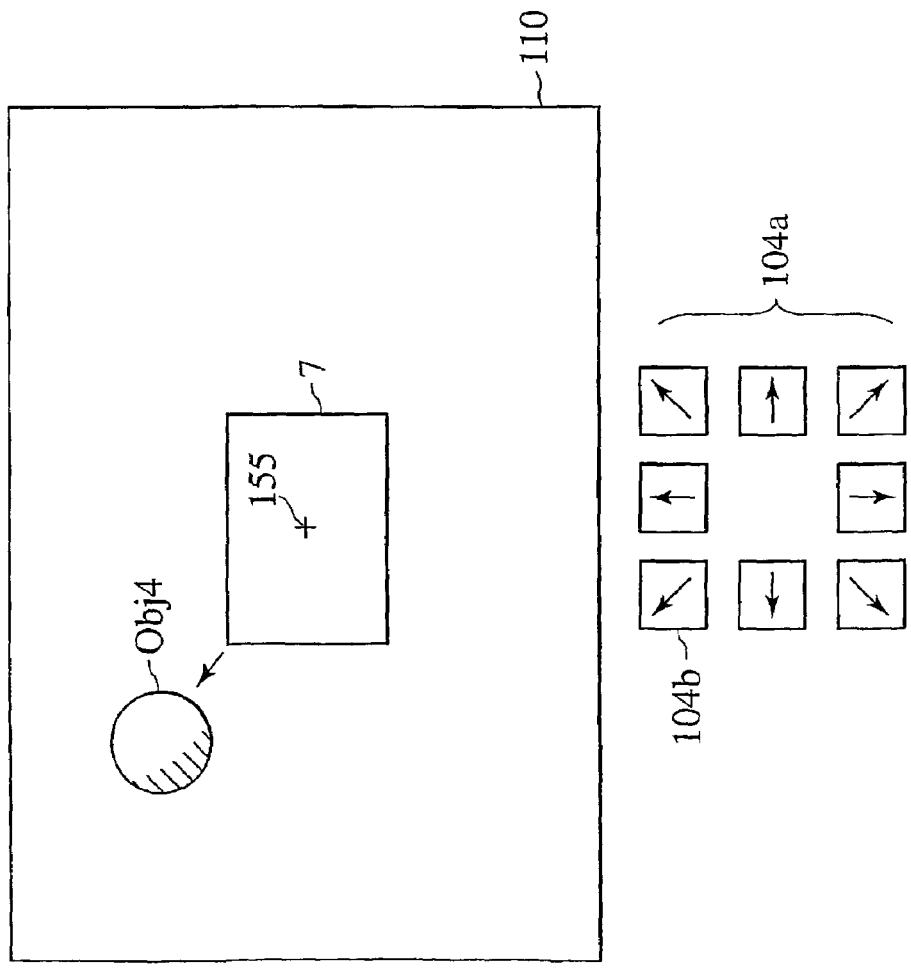

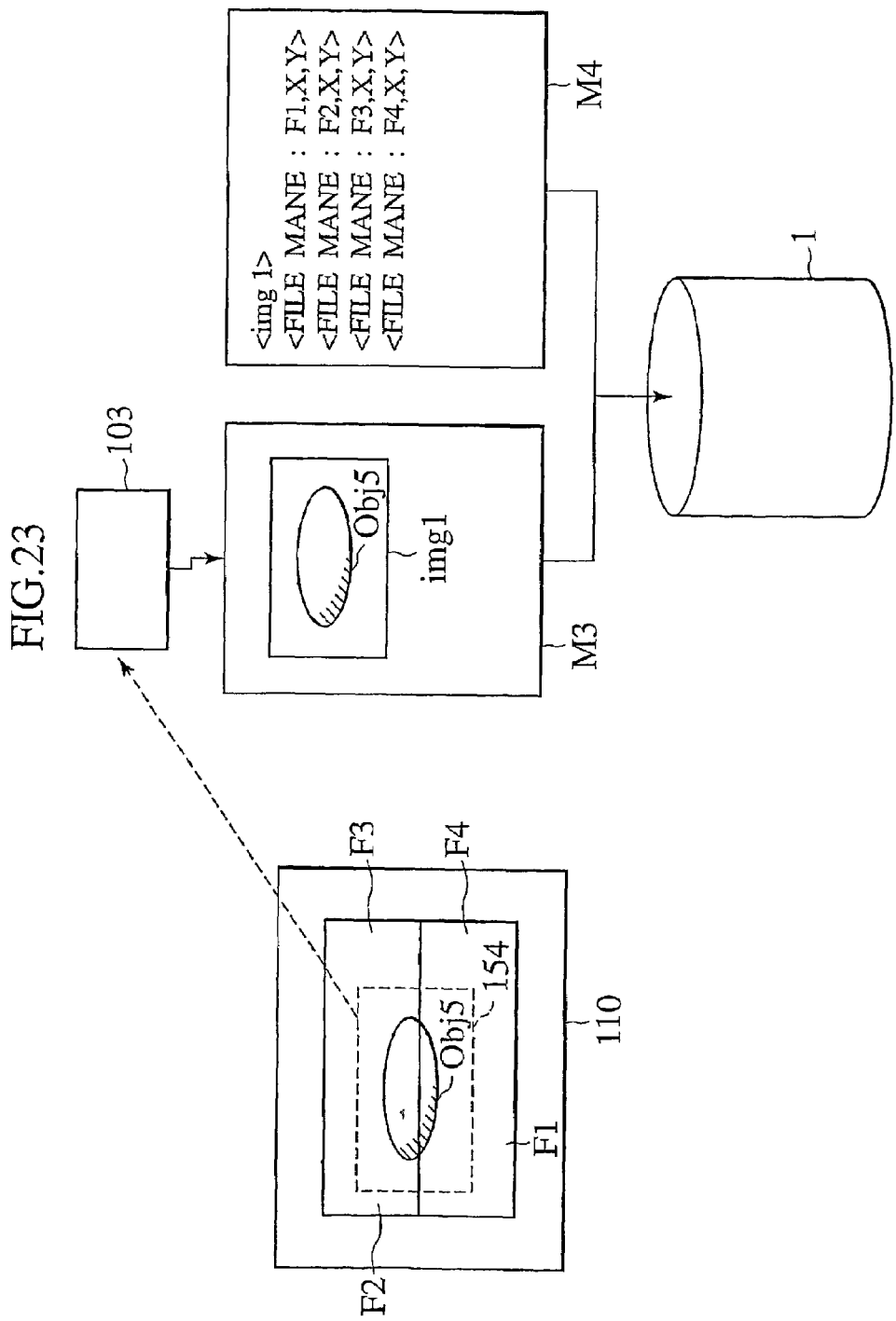

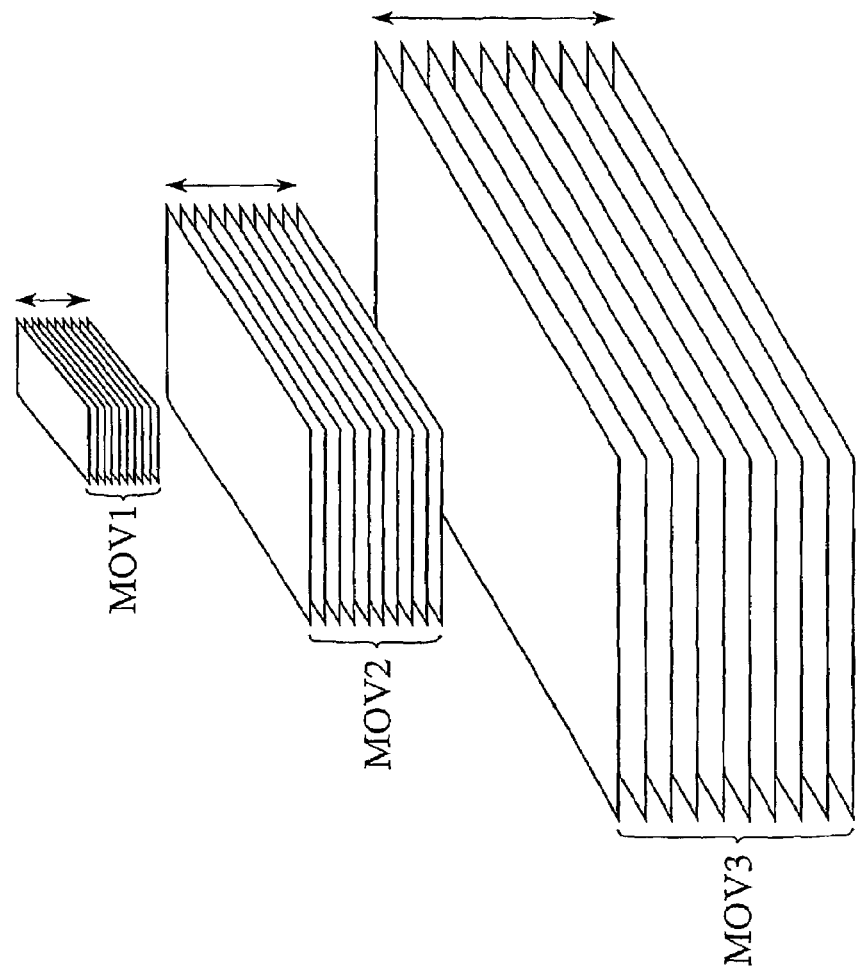
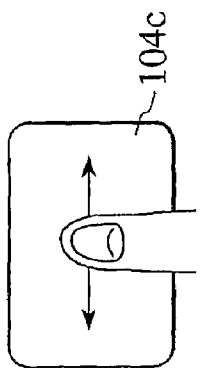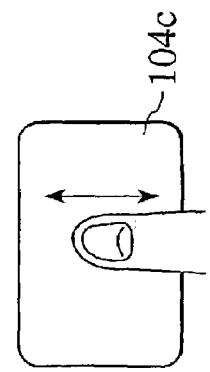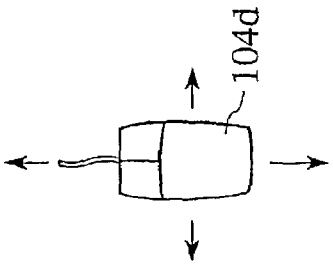
FIG.25a
FIG.25b
FIG.25c

IMAGE DATA DISPLAYING SYSTEM AND METHOD

RELATED APPLICATIONS

The present PCT application claims priorities of Korean Patent Application No.10-2000-0047344 filed in Aug. 17, 2000, Korean Patent Application No.10-2000-0047345 filed in Aug. 17, 2000, Korean Patent Application No.10-2000-0059645 filed in Oct. 11, 2000, and the Japanese Patent Application No.2001-52828 filed in Feb. 27, 2001.

This present invention is related to a system and method for displaying huge images or integrated images of multiple data and, in particular, to a system for directly displaying a huge image without first storing the image data in the main memory in order to quickly display images.

Also, the present invention is related to a data file browsing device and program for browsing data files which contain text and image, and related to a data file conversion program for generating data files which can be browsed by the data file browsing device and program.

BACKGROUND OF THE INVENTION

It was known that, if data items associated with each other were displayed in the same screen, information could be provided in a manner that allows the user to search desired information easily through a GUI (Graphic User Interface). Accordingly, the user would save time and efforts required for searching information. For example, if images of the globe, transmitted from a weather satellite, were integrated and displayed as a single image data, one could easily get an overview of the geographical and/or meteorological information. It would also be possible to search the single image for an area of interest through a graphic interface. Also, unattended terminals (Kiosk) located in museums, public offices and so forth, designed to provide a huge amount of information, may do so by integrating its information into a visual image so that visitors can easily search desired information.

Quickly processing a huge amount of image data is becoming essential also in the fields of science and education. For example, in the human genome project that generates a huge amount of image data it is critical that scientists be able to easily and quickly locate information they need from the accumulated data.

The ever expanding Internet environment creates new needs for techniques of processing and searching huge image data. Particularly, the Internet II project, in progress in the U.S.A., would provide an infrastructure on which an extremely large amount of data could flow, thereby allowing provision of remote services such as telemedicine, distance education and so forth. These services are known to involve a huge amount of image data, indicating a need for methods to transmit, reproduce and to do search in a huge amount of image data.

However, combining disparate data items into a single integrated image has not been the preferred method because it would involve too much to process a huge amount of data. But this is no longer true nowadays with increased computing power and high speed communication network environment.

However, there exists other limits to displaying a huge image using conventional techniques, one of which is shown in FIG. 1. Here, the image display system is composed of a hard disk drive (1), a main memory (3) for temporarily storing data read from the hard disk drive (1), a video buffer (5) for storing the data read from the main memory (3), a screen window to display images with the help of a graphics user interface (GUI:Graphic User Interface). These elements are well known in the industry and therefore more detailed explanation will not be made. This kind of conventional image displaying system has problems. Firstly, while the image data stored in the hard disk drive (1) is temporarily stored in the main memory, the operation speed of the main memory (3) is not high enough to display a huge image. Accordingly, the main memory is a bottle neck, preventing a prompt display of the image to the screen window. The bottle neck becomes worse as the amount of data increases.

Secondly, it is impossible to provide information in a manner intuitively familiar to the user. Specifically, the users of graphical information would be provided with segmental information as part of the graphical information instead of the entirety of the graphical information. Accordingly, the information items associated with each other cannot be given in such a way that allows an easier understanding of the entirety of the graphical information.

Thirdly, it is not easy to search for information. With a conventional GUI, the users of graphical information search for desired information by inevitably performing input operations such as manipulating menu keys and so forth. Accordingly, a lot of time has to be invested in order to get the desired information.

And, it is also required to provide the individual data items as a single visual image by converting the individual data items to the integrated image in order that the graphical information is provided in a manner substantially based upon the user's experiences and intuition, making it possible to easily search the desired information from a huge amount of data.

SUMMARY OF THE INVENTION

Therefore, it is an objective of the present invention to provide a huge image display system that can transfer image data directly from a hard disk drive to a video buffer without using the main memory. With the inventive system, it is possible to provide information in an intuitive manner to human users.

It is another objective of the present invention to provide a GUI based strongly upon human intuition so that the user of the huge image information can easily and quickly make use of the graphical information.

It is yet another objective of the present invention to provide instant information on a part of image specified by the user.

It is yet another objective of the present invention to maintain a constant resolution irrespective of zoom ratio of the image.

Also, in order to solve the above described problem when individual data items are separately provided, in accordance with the present invention, the individual data items are integrated into a single huge image manifold, which is quickly reproduced by means of the system for displaying integrated image. Furthermore, a new GUI design enables users to easily search the graphical information.

For this purpose, it is an objective of the present invention to provide a system capable of integrating individual data items stored in a hard disk drive into a single huge image data item.

Also, it is another objective of the present invention to provide a system capable of displaying the huge integrated image data without delay.

Furthermore, it is an objective of the present invention to provide a GUI (Graphic User Interface) to easily search desired information from the integrated image data.

Still further, it is a further objective of the present invention to provide a constant resolution regardless of the zoom ratio of the images as selected by the users of graphical information.

Finally, it is a further objective of the present invention to provide natural newspaper information and satellite information by applying the integrated image display system to a broadcast system in accordance with the present invention.

One aspect of the present invention relates to a system for displaying huge images, which comprises:

a storing means for storing image data which is divided either in row or in column into at least two blocks; and a first temporary storing means for temporarily storing data read from said storing means and, when filled up to a predetermined level, outputting all the data.

The system for displaying huge images serves to improve the processing speed of huge images by bypassing the main memory (3) during the processing operation of image data. Huge image data stored in the hard disk drive (1) is divided in an appropriate manner into divided image data items, which are transferred directly to the video buffer (5) bypassing the main storage.

The huge image data is transferred to the video buffer (5) unit-by-unit corresponding to a predetermined unit of division. Before recording in the video buffer (5), the respective divided image data items are temporarily stored in a line buffer (9). The capacity of the line buffer (9) is sufficient as long as it is capable of storing one divided item of the huge image data while it is possible to quickly read and write data without delay like the main memory (3).

The system for displaying huge images does not use a conventional GUI. In place of this, an interface is provided in a manner strongly based upon the user's intuition so that the user of image data can easily and quickly search images displayed in the screen window (7).

The system for displaying huge images correlates the location in the huge image as displayed in the screen window (7) with the location of the mouse cursor in order to provide information at the huge image location without particular manipulation of a menu key. In the case of another embodiment of the present invention, another input device such as a joystick can be used in place of a mouse.

Also, the system for displaying huge images provides a constant resolution regardless of the zoom ratio of the images, i.e., expansion or reduction. For this purpose, the huge image data is stored in the hard disk drive (1) in a hierarchical structure.

Another aspect of the present invention relates to an integrated image data display system of a plurality of individual data items, which comprises:

an image integration means for aggregating said plurality of individual data items into said single integrated image data;

a storage device for storing said integrated image data by dividing in either row or column into at least two blocks;

a first temporary storing means for temporarily storing data from said storing means device; and outputting all the data from said first temporary storing means when said first temporary storing means is filled with a predetermined amount of data.

In the system for displaying integrated images of the present invention, individual data items are integrated into a single huge image data item to generate a single integrated image data. When the individual data items are integrated, the locations of the individual data items are determined in accordance with the extents to which the individual data items have relevance to each other. The individual data items may be image data, or text data such as html (hyper text markup language) data.

The system for displaying integrated images displays huge image data as a single integrated image data item without delay. For this purpose, in contrast to reproducing images in a conventional imaging system, the images are reproduced bypassing the RAM which is the cause of signal delay.

The system for displaying integrated images does not use a conventional GUI but provides an interface strongly based upon the human intuition. By this configuration, the user can easily and quickly search information in the integrated image. While the user can change the zoom ratio of the screen image through the GUI in accordance with the present invention, a constant resolution is maintained irrespective of the zoom ratio of the images selected by the user.

The system for displaying integrated images provides an integrated image display service through a network. The server of the integrated image display service serves to generate integrated images and transfer necessary portions to a display device when requested by a client.

Also, the present invention is related to a data file browsing program for browsing data files that include text data and image data. The data file browsing program comprises the steps of:

obtaining said data file as a plurality of image data items in a hierarchy with different image sizes according to zoom ratios;

generating virtual layers for the respective zoom ratios;

setting the positional coordinates of said respective hierarchical image data items in each virtual layer;

receiving a zoom ratio from a user;

selecting hierarchical image data items located within the display area matching said zoom ratio; and reading selected hierarchical image data items from a storage device and generating, as display data, image data portions which are actually to be displayed in the display area.

Meanwhile, the data which is browsed by the data file browsing program and system as described above can be generated by a data file conversion program comprising a step of converting the data file into a plurality of the image data items (the hierarchical image data items) with different image sizes by expansion or compression;

and a step of generating virtual layers for the respective zoom ratios, calculating the positional coordinates of the respective hierarchical image data items in each virtual layer and writing the positional coordinates to a virtual coordinate file.

Also, another aspect of the present invention is related to a data file browsing system for browsing a data file that contains text and image data. The system comprises a storing mechanism for storing the data file as a plurality of image data items (hierarchical image data items) with different image sizes by expansion or compression; a virtual coordinate generation mechanism for generating virtual layers for the respective zoom ratios and for setting the positional coordinates of the respective hierarchical image data items in each virtual layer; zoom ratio switching mechanism for obtaining the zoom ratio as required by the user in order to determine the layer to be displayed; a display area detection mechanism for selecting all the hierarchical image data items located within the display area as required by the user; and a display data generation mechanism for reading the selected hierarchical image data items from a storage device and generating, as display data, image data portions which are actually displayed in the display area.

In accordance with these aspects of the present invention, it is possible to display images from the virtual layers by the use of a plurality of the hierarchical image data items obtained by converting image files, HTML files and so forth with different zoom ratios, while maintaining a constant resolution irrespective of the zoom ratio of images. When the user requests a new zoom ratio, the zooming in or out operation can be performed without changing the resolution, by switching the virtual layer and reading and expanding the required hierarchical image data items to provide display data.

Meanwhile, in accordance with these aspects of the present invention, it is possible to obtain the positional coordinates of modifier information in the hierarchical image data items by parsing the modifier information from tag data contained in the text data of the data file and to insert the modifier information as obtained to the display data.

Also, in accordance with these aspects of the present invention, it is possible to obtain linking information contained in the data file for jumping to other files and to obtain the display coordinates for launching a command execution process corresponding to the linking information.

Also, in accordance with these aspects of the present invention, it is possible to generate the respective hierarchical image data items by sequentially reading a plurality of data files and to combine and display to screen the hierarchical image data items belonging to each virtual layer.

BRIEF DESCRIPTION OF DRAWINGS

FIG. 3d is an explanatory view for showing the method of reading out image data items in accordance with a conventional technique.

FIG. 3e is an explanatory view for showing the method of reading out image data items in accordance with the present invention.

FIG. 13 is a block diagram showing an embodiment of a broadcast system which uses the integrated image display system in accordance with the present invention.

FIG. 16 is an explanatory view for schematically showing the file conversion process in accordance with an embodiment of the present invention.

FIG. 21 is an explanatory view showing an exemplary modification in accordance with the present invention for explaining the arrangement of Web pages in the form of an array in a plane.

FIG. 22 is an explanatory view showing an exemplary modification in accordance with the present invention for explaining the interface for manipulating a cursor.

FIG. 23 is an explanatory view showing an exemplary modification in accordance with the present invention for explaining the process of generating an album file.

FIG. 25 is an explanatory view showing an exemplary modification in accordance with the present invention for explaining the interface of handling motion pictures.

DETAILED DESCRIPTION OF THE PRESENT INVENTION

[Method and System for Large Image Display]

(Construction of the System for Large Image Display)

Figure 1:
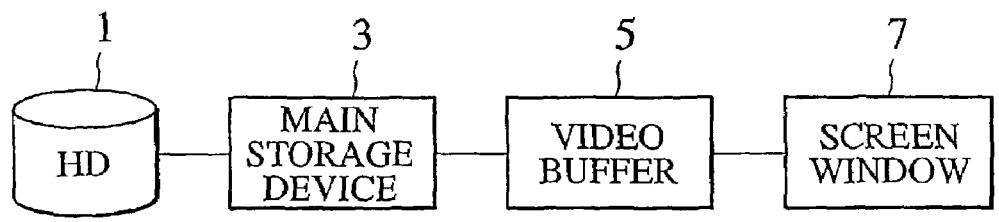
FIG. 1 is a block diagram showing an image display system in accordance with a conventional technique.
Figure 2:
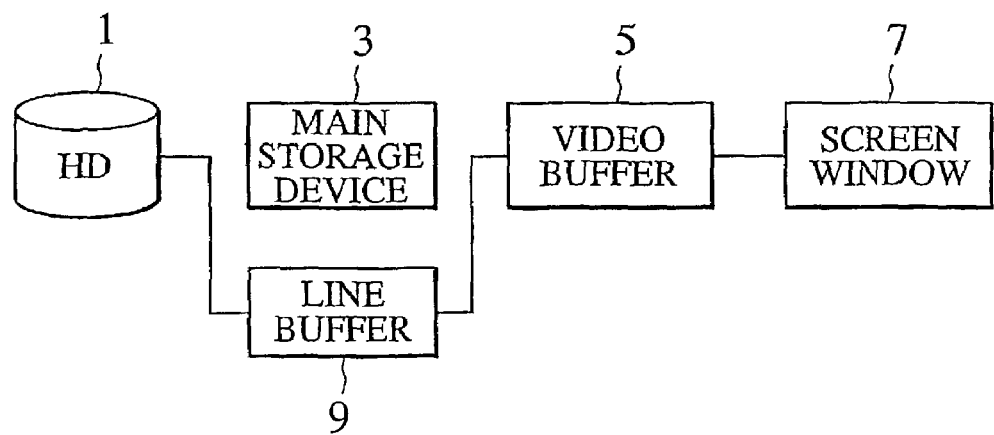
FIG. 2 is a block diagram showing the configuration of an embodiment of a huge image display system in accordance with the present embodiment.

In the following description, the method of the huge image display system in accordance with the present invention will be explained in details with reference to the accompanied drawings. FIG. 2 is a block diagram showing the configuration of an embodiment of the huge image display system in accordance with the present invention. Compared with the conventional system as illustrated in FIG. 1, a line buffer (9) is added. This line buffer is between the hard disk and the video buffer, with the main memory bypassed. Accordingly, delay due to the main memory (3) is eliminated, which helps to quickly reproduce huge images.

According to the present embodiment, data presenting a huge image is divided in a unique fashion for the purpose of quickly reproducing the huge image. The line buffer (9) is provided with a sufficient capacity to store one division of the image data. Unlike the slower main memory (3), the line buffer (9) receives data one unit at a time in the line buffer, thereby eliminating a delay that would have been caused if data had to be temporarily stored. As a result, it is possible to quickly reproduce images by dividing huge image data in a suitable manner and sequentially transferring the respective divided data, bypassing the main memory (3).

Figure 3A:
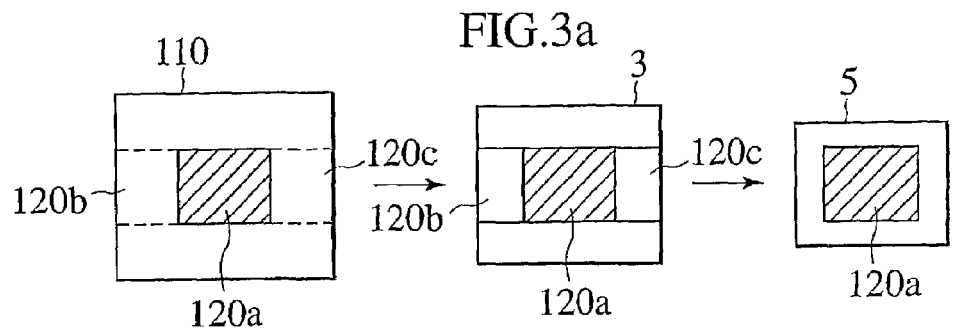
FIG. 3a shows the process of transferring image data in accordance with the conventional imaging system.

FIG. 3a shows the flow of image data from the hard disk drive (1) to the screen window (7) in the case that the image is stored without being divided. Let's assume that a portion (120a) of the huge image data (110), is to be displayed in the screen window (7). While it is preferable to selectively read only this portion of data for display(120a), neighboring data (120b and 120c) must be read too because the huge image data (110) is stored in the main memory (3) without divisions. Only the display data is read out from the main memory (3) and is stored in the video buffer (5). The use of this slower main memory causes substantial delays when reproducing images.

Figure 3B:
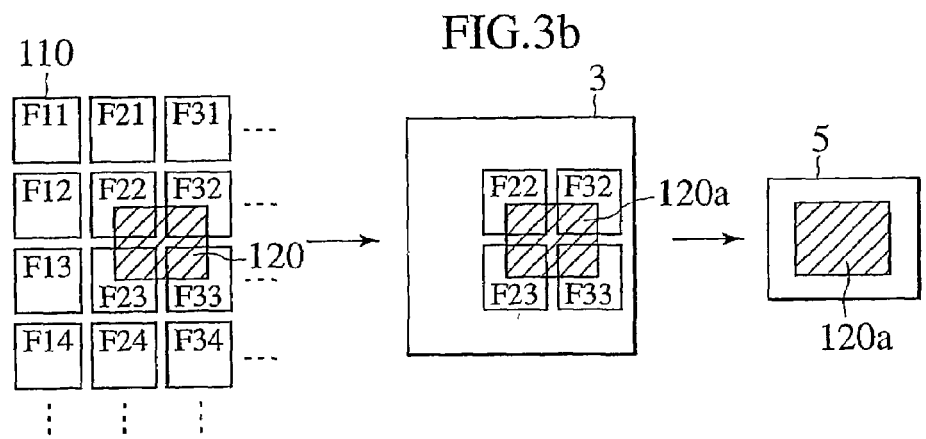
FIG. 3b shows the process of transferring image data in accordance with the conventional imaging system.

By dividing the huge image data (110) in an appropriate manner, it is possible to solve the above problem. FIG. 3b shows the flow of data in the reproduction an image whose data is stored divided in accordance with the present technique.

As illustrated in the figure, the huge image data (110) is composed of a number of subdivided blocks (Fij represents a subdivided block at the i-th row and the j-th column). The subdivided blocks (F22, F32, F23 and F33) associated with the display data (120), initially stored in the hard disk drive, are loaded into main memory. Then, only the display data (120) is read out from the main memory (3) and transferred to the video buffer (5).

According to the present technique, it is possible to reduce the amount of data that are stored in the main memory (3) but are not actually displayed in the screen. However, there is a substantial delay because the main memory (3) having a slower operation speed is still used.

Figure 3C:
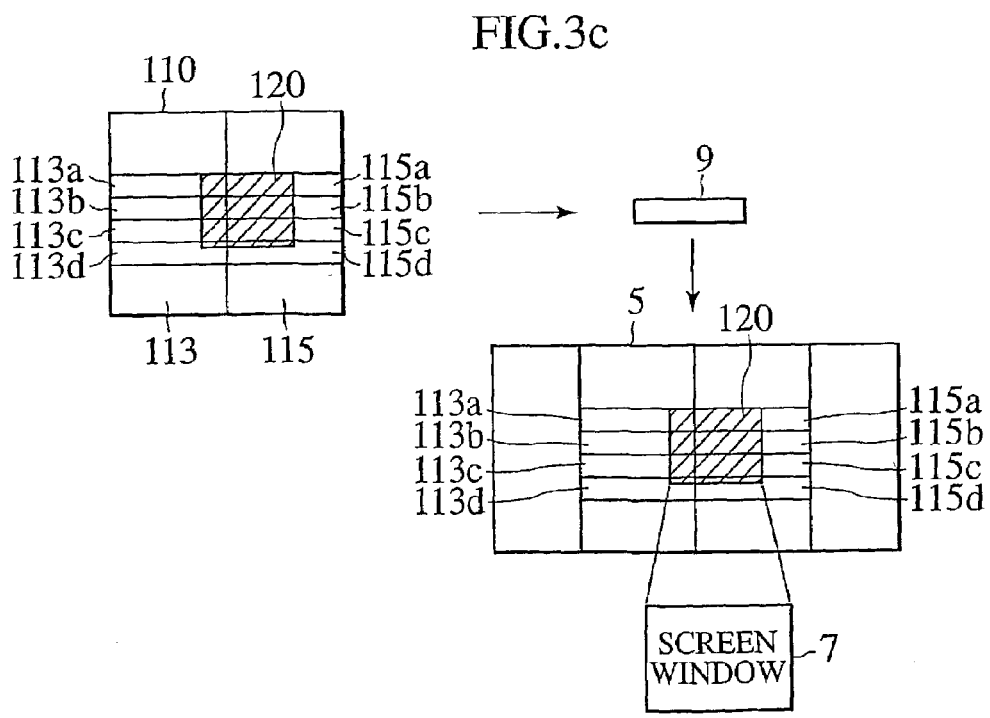
FIG. 3c shows the process of transferring image data in accordance with the present embodiment.

FIG. 3c shows the flow of image data in accordance with the present embodiment. Here, the main memory (3) is not used. As illustrated in FIG. 3c, the image data (110) stored in the hard disk drive (1) is read into the line buffer unit-by-unit up to the capacity of the line buffer, before subsequently being transferred to the video buffer.

Since an amount of an image data that is read at one time corresponds to the capacity of the line buffer (9), the image data (110) is stored in the hard disk drive (1) in the form of divided blocks. In this case, unlike the conventional technique as illustrated in FIG. 3b, the image data (110) is divided into subdivided image data (113 and 115) either in row or in column while a block size (113a to 113d and 115a to 115d) corresponds to the capacity of the line buffer (9). The size of the subdivisions may be selected according to the user's needs.

It is illustrated in FIG. 3c that the image data (110) is divided into two (113 and 115). However, the image could be divided into more than two, depending on the size of the line buffer (9) and the size of the image data.

As illustrated in FIG. 3d, the image data is generally composed of a number of pixels arranged in an array. The pixel values are arranged in the form of a plurality of lines LINE1, LINE2, LINE3 . . . which are extending in the lateral direction respectively and aligned in the vertical direction in order to represent the image. In accordance with a conventional technique, when the image data 110 is written to a disk of a hard disk drive, the image data 110 is read out in the direction of the LINEs. The respective LINEs as read out are written to the sectors of the disk.

When the image data 110 includes necessary data 120, the necessary data 120 is written to the disk as the image data portions 120j to 120l that are certain portions of the respective LINEs. Accordingly, when the necessary data 120 is to be displayed, it is required to read the image data portions 120j to 120l one after another which are dispersed in the disk. The portion of image data (120j to 120l) needed are separately located so that it is inevitable to jump intervening sectors in order to read the next image data portion. Two sectors jumps occur in the case as illustrated in FIG. 3d. A mechanical operation is necessary for each sector jump. Thus, a larger number of sector changes lead to a longer delay time to complete the read operation.

In accordance with the present invention, however, the image data 110 is divided in either lateral or vertical direction so that it is possible to reduce the time delay by not having to read all the necessary data 120.

Namely, the image data 110 is divided into a plurality of image data sections 113 and 115 in a direction perpendicular to the direction in which data would be read. Each of the image data sections 113 and 115 is obtained by partially reading out the respective LINEs which are arranged in the lateral direction (the reading direction) in the form of a band. The data in the form of a band has been written to the disk.

Accordingly, a desired portion located in the middle of the image is also divided into a left half 113 composed of the data items 120d to 120f and a right half composed of the data items 120g to 120i. When the image is stored in a disk, data items 120*d*-120*f* are written continuously onto one track in the disk. The same is true with data item 120*g* to 120*i*.

Accordingly, the desired portion of the image 120 would be retrieved by sequentially reading the data items 120*d* to 120*f*, and then jumping to the beginning of data item 120*g*. Data items 120*g* to 120*i* are sequentially read. In this way, only a single sector change operation is required. As a result, the reading speed becomes higher compared with the conventional technique. A vertically longer portion of image would be read more quickly than a horizontally longer portion.

The process of handling the huge image data by the use of the line buffer (9) without delay can be explained with reference to FIG. 3*c* as follows:

First, determine the divided sections needed to generate the display data (120) from the huge image data (110). The display data (120) is a portion of the image to be actually displayed in the screen window (7). As illustrated in the figure, the display data (120) partially overlaps the two vertically divided blocks (113 and 115). The first block (113) is read before the second block (115).

The respective subdivisions (113*a* to 113*d* and 115*a* to 115*d*), each corresponding to the capacity of the line buffer (9), are sequentially read and transferred to the line buffer (9). Each time the line buffer (7) is full, its content is transferred to and recorded in the video buffer (7). As illustrated in the figure, the display data (120) is composed of eight subdivisions (113*a* to 113*d* and 115*a* to 115*d*), resulting in the loading of the line buffer (9) with a subdivision and its subsequent transfer to the video buffer (7) eight times.

Since, unlike the main memory RAM of the computer, the line buffer (9) has a smaller capacity but a faster operation speed there is little delay associated with the process of transferring the subdivisions from the hard disk drive (1) to the video buffer (5). This helps to quickly display a huge image.

The video buffer (5) stores data in units of subdivisions. As a result, extra data other than the display data (120) are inevitably stored in the video buffer (5). Generally speaking, the capacity of the video buffer (5) exceeds that required for displaying a full screen of image. In fact, according to the present embodiment, smooth movement of images is provided by making use of the video buffer (5) which can store more than a full screen of data. An image is finally displayed on the screen window (7) by reading only the display data (120) from subdivisions stored in the video buffer.

Figure 4:
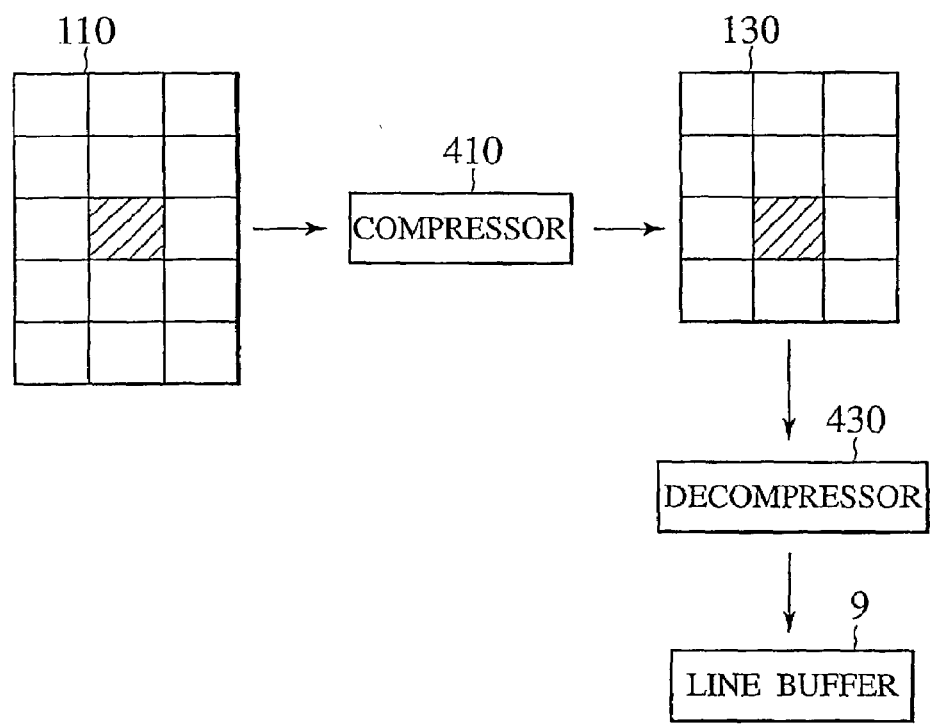
FIG. 4 is a schematic representation showing the image reproducing method using compressed data in the imaging system as illustrated in FIG. 3c.

The quick image reproducing method as described above is applicable not only to raw image data but also to compressed data. FIG. 4 is a schematic representation showing a method for displaying an compressed image data.

Since data is transferred in units of sub-image data, each subunit has to be separately generated. First, a raw image data is compressed by separately compressing the subdivisions, using a compressor (410). The sub-image data, now compressed, is stored in the hard disk drive (1) again. Since the compressed data itself cannot be used for the quick image reproduction it is first decompressed by means of a decompressor (430) and stored in the line buffer (9). Then, the image can be displayed in the same manner as illustrated in FIG. 3*c*. The compression scheme may be JPEG, JPG, MPEG or the like.

(The GUI Configuration)

Figure 5A:
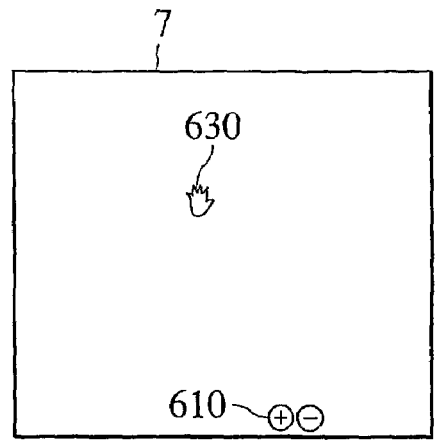
FIG. 5a is a schematic representation showing an example of the GUI (graphic user interface) of the huge image displaying system in accordance with the present embodiment.

FIG. 5*a* is a schematic representation of the GUI for the huge image displaying system in accordance with the present embodiment.

As described above, conventional GUIs are not suitable for displaying a huge image because of a delay stemming from the use of the computer's main memory. Particularly, when one has to search for information in the huge image, image scrolling on the screen is slow, thereby making a search effort a difficult job.

As illustrated in the figure, the inventive imaging system provides a pointer (630) to easily "scroll" the huge image data displayed on the screen window (7) and to display relevant data related to the display image. Also, icons such as (+) and (−) are displayed on the screen to scale the displayed image. The image is scrolled in any directions through straightforward manipulation of the pointer (630). The location of the pointer (630) on the image is the location of the image data in the hard drive. Therefore, the movement of the pointer (630) is instantly interpreted to read the correct data from the hard disk drive, resulting in the corresponding scroll of the image. By dragging the pointer one can see the image panoramically. A benefit is that there is no momentary blank screen area as the image is moved, due to a delay in transferring the image data (110) from the hard disk drive.

Figure 5B:
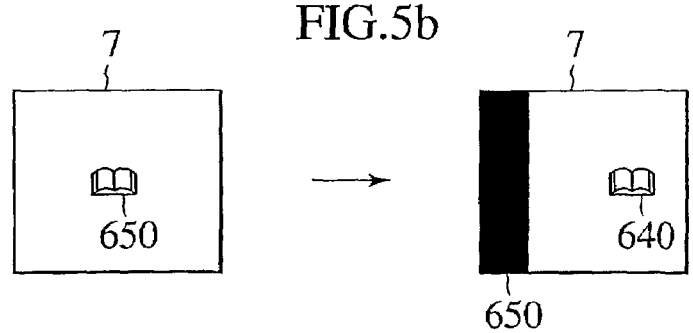
FIG. 5b is a schematic representation illustrating a rectangular area in which is not painted the graphical information during the movement of the image in the case of the conventional imaging system.

FIG. 5*b* shows a blank area (650) at one side of the screen when the image is moved in the other direction according to a conventional imaging system. Specifically, when the image is moved to the right, the blank area appears due to delay in reading image data corresponding to that area from the hard disk drive. However, no such blank area appears according to the present invention and the image moves smoothly.

(Virtual Screen or Double Buffering)

In accordance with another embodiment of the present invention, it is possible to provide natural movement of images in the screen by the use of a virtual screen or the doubling buffering technique.

Figure 5C:
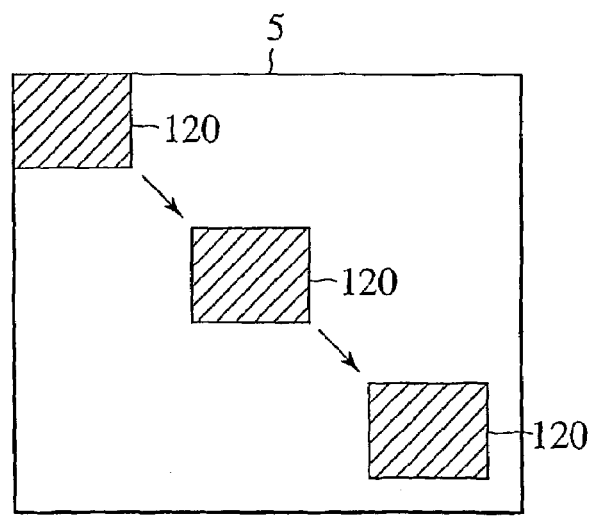
FIG. 5c is a schematic representation showing the process of the movement of the display data in the video buffer when the virtual screen is introduced in accordance with the present invention.

FIG. 5*c* shows the process of the movement of the display data (120) in the video buffer in when a virtual screen is introduced. It is possible to provide more natural movement of images on the screen by the use of the video buffer (5) to store more than a full screen of image data.

The following table 1 compares a system in accordance with the present embodiment and a representative conventional image display system (sold under the trade names of "adobe photoshop"), when a satellite image of the North American Continent is displayed.

TABLE 1

| COMPARISON ITEMS | THE SYSTEM OF THE PRESENT INVENTION | ADOBE PHOTOSHOP |
|---|---|---|
| LOADING TIME SCROLLING | NO LONGER THAN 0.5 NATURAL SCROLLING | 87.28 RECTANGULAR BLOCK DUE TO SECOND SPEED DELAY |

As shown in Table 1, the image display system in accordance with the present embodiment, there is little delay because the main memory is not involved.

Figure 6:
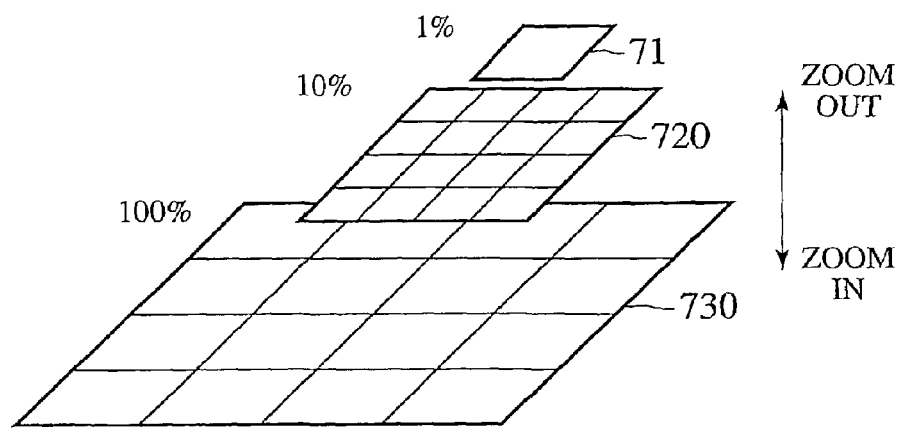
FIG. 6 is a schematic representation showing the hierarchical structure of the image data in accordance with the present embodiment while maintaining a constant resolution irrespective of the zoom ratio of images, i.e., expansion or reduction.

Also, the present invention provides images on the screen with a variety of zoom ratios without decreasing the resolution at high zoom ratios. For instance, the resolution of an image of the globe will have the same resolution as a zoomed-in image of a country. To achieve this, the present invention pre-stores images in a hierarchical structure. FIG. 6 shows hierarchically stored images. The image data (710) on the upper layer is used to display the whole image. The image data (730) on the lower layers are used to display zoom-in portions of the image from successively higher layers. For example, when a screen image 710 currently displayed on the screen is to be zoomed in by a factor of 10, an image having data ten times greater than the zoomed-in portion is required for maintaining the same resolution. The image data (720) on the lower layer is used in this case. A multi-level hierarchical structure could be designed to provide various zoom ratios in the GUI. For instance, if the GUI provides 10 zoom ratios, the image data (110) has to be of a ten-layered hierarchical structure. Respective zoomed images can also be generated for desired sizes of data by interpolation and decimation. The present invention enables a smooth transition from one zoom ratio to another since data can be quickly read from the hard disk drive (1) as describe above.

Figure 7:
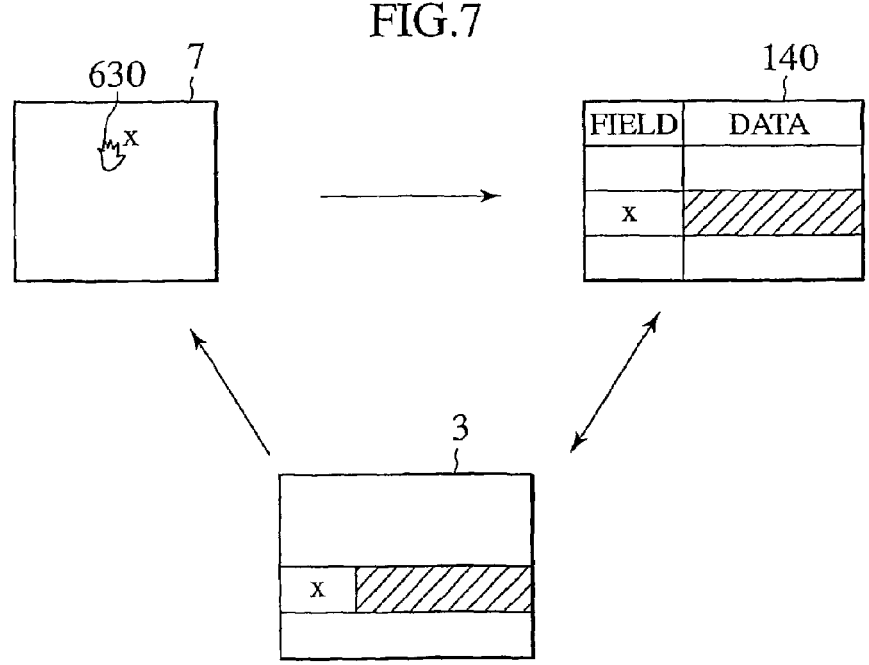
FIG. 7 is a schematic representation showing the process of providing image data associated with the screen image designated with the pointer by correlating the pointer location and the screen window with each other.

FIG. 7 shows how the pointer is synchronized with the image data. The GUI of the system in accordance with the present embodiment serves to provide the user with references related to the locations on the screen image specified by the pointer (630) without particular manipulation of a menu key by synchronizing the pointer (630) and the screen window (7) with each other. In the figure, the location of the image corresponding to the location of the pointer (630) is indicated by (x). As the pointer (630) moves over the screen window the data of the screen image specified by said pointer is tracked. Information about the location of the screen image is stored as information data (140) in the hard disk drive. The information data (140) includes a field containing reference data and another field of image co-ordinates for that data indicative of the location of the screen image and a field containing the data. The information data is stored in the main memory and is displayed in the screen window (7) in response to a predetermined event such as keeping the pointer (630) in the same position.

The huge image display system as illustrated in FIG. 2 can be extended through a network. Namely, a huge image information service can be provided by connecting a database system of huge images to users at their computers through a network. Since the inventive imaging system makes use of the line buffer (9) without a need for a main memory, it can be practiced even with a low-cost personal computer. In addition, because, only those data to be displayed on the screen (corresponding to the size of the line buffer) is read and transmitted to the user, it is particularly suitable for transmission of huge image data through a network.

[Method and System for Displaying Integrated Images of Multiple Data]

Figure 8:
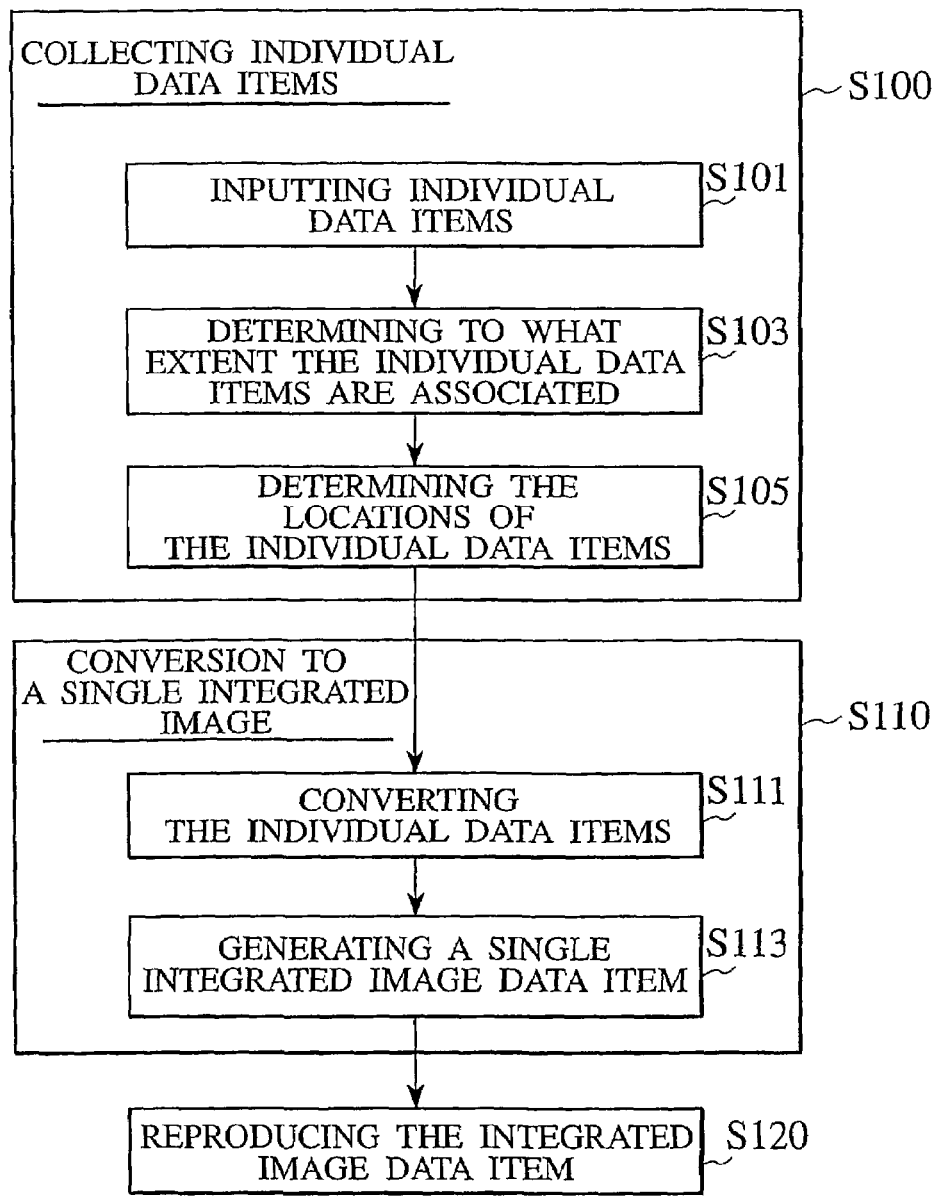
FIG. 8 is a flowchart showing the process for providing integrated images by integrating individual data items in the integrated image display system in accordance with the present embodiment.

FIG. 8 is a flowchart showing the process of providing an integrated image by combining individual data items in accordance with the present embodiment.

Specifically, individual data items are first collected at the collecting step (S100). The individual data items generally will relate to each other. Examples of the individual data items include pages of a newspaper, linked web text, satellite information as received from a satellite and so forth. Nevertheless, integration is applicable to individual data items having no particular association with each other. The individual data items can be any data types including image and text.

Step (S100) includes three substeps (S101, S103 and S105). Individual data items are input to the integrated image display system in the substep (S101). It is determined to what extent the individual data items are associated to each other in the substep (S103). The locations of the individual data items in the integrated image have to be carefully selected in order to provide users with a convenient interface environment to control the image. One criterion will be to take advantage of human intuition. For instance, when pages of a newspaper is to be integrated, it seems desirable to arrange the pages according to the page numbers because, in most cases, a reader of newspaper would read from the first page to the last page. In the case of web pages, the linking structure of the web pages could be used because a web user is normally led to a specific page through one or more links. In short, the locations of the individual data items in an integrated image are determined depending on how the individual data items are relevant to each other in the step (S103).

Figure 10:
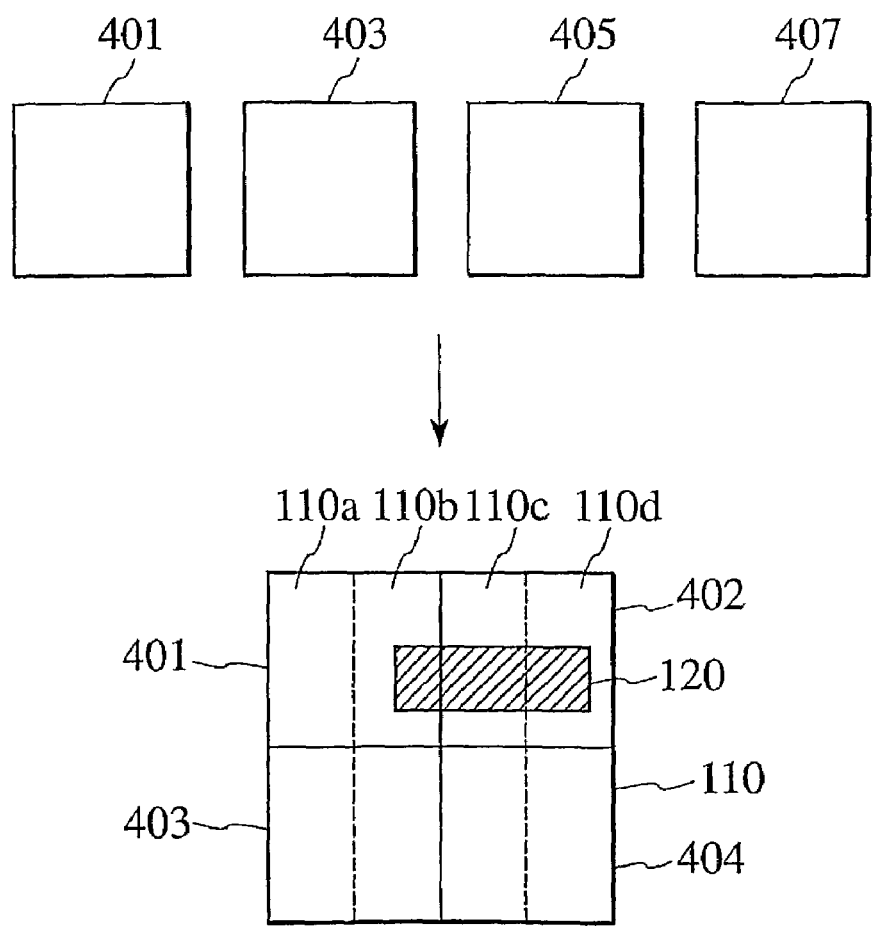
FIG. 10 is a schematic representation showing an embodiment of the process in which an integrated image data item is generated by integrating individual data items having the same file dimensions.
Figure 11:
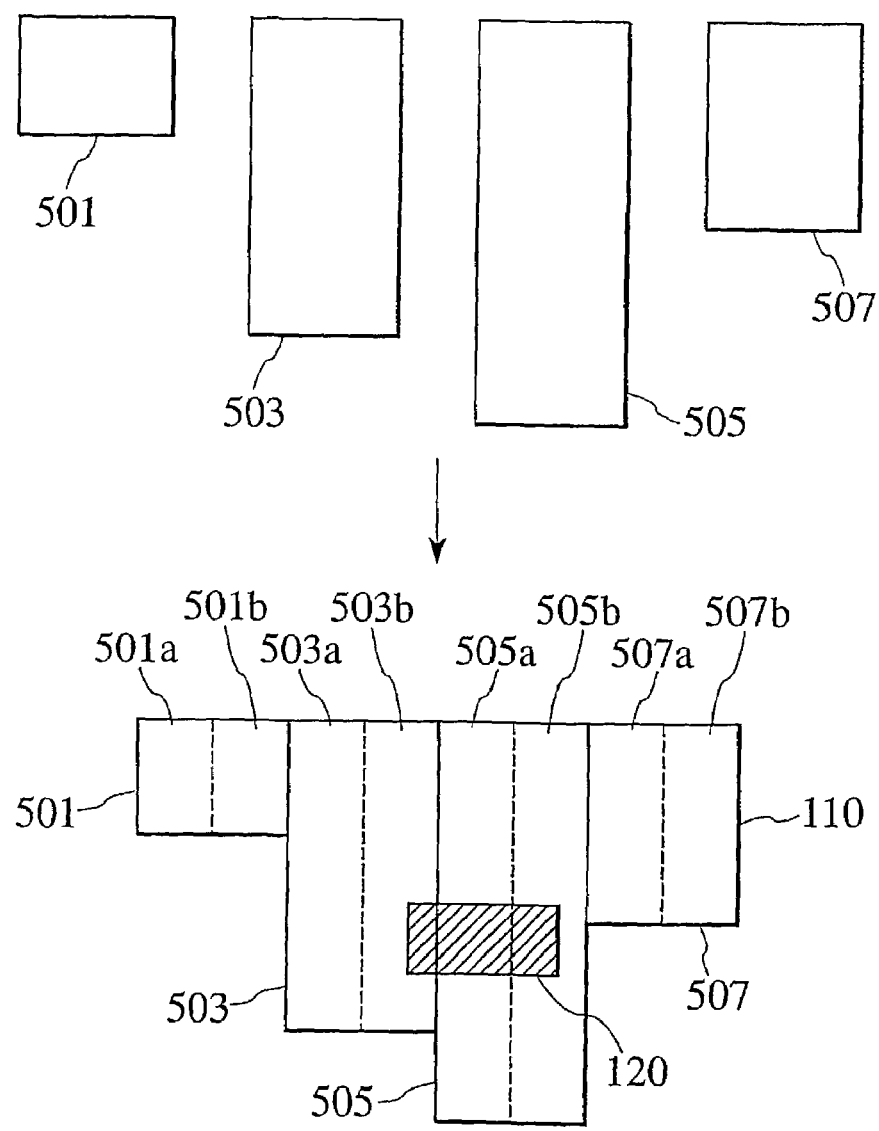
FIG. 11 is a schematic representation showing an embodiment of the process in which an integrated image data item is generated by integrating individual data items having different file dimensions.

A single image data item can be constructed not only with individual data items having the same file dimensions but also with individual data items having different file dimensions. For example, web pages linked to each other could have different file dimensions. FIG. 10 and FIG. 11 show the integration of individual data items of the same file dimensions into a single file and individual data items of different file dimensions.

The individual data items collected at step (S100) are converted to data indicative of a single integrated image in the integrated image generation step (S110), which includes two substeps (S111 and S113). At Step (S11) the individual data items from a variety of formats such as GIF, TIFF or HTML etc, are converted to a file format suitable for integration. Converted data items may contain text data, image data or other types. These converted data items are used to generate a single integrated image at step (S113).

Thus a huge integrated image is quickly generated (S120). Also, the users of graphical information can readily search for graphical information through a convenient interface. The users can select desired items in the integrated image through the interface as described above. For instance, the screen image could be zoomed in with the same resolution irrespective of zoom ratios.

<Quick Reproduction of Integrated Images>

According to one aspect of the present invention, an integrated image can be quickly reproduced, as described in details below.

Figure 9:
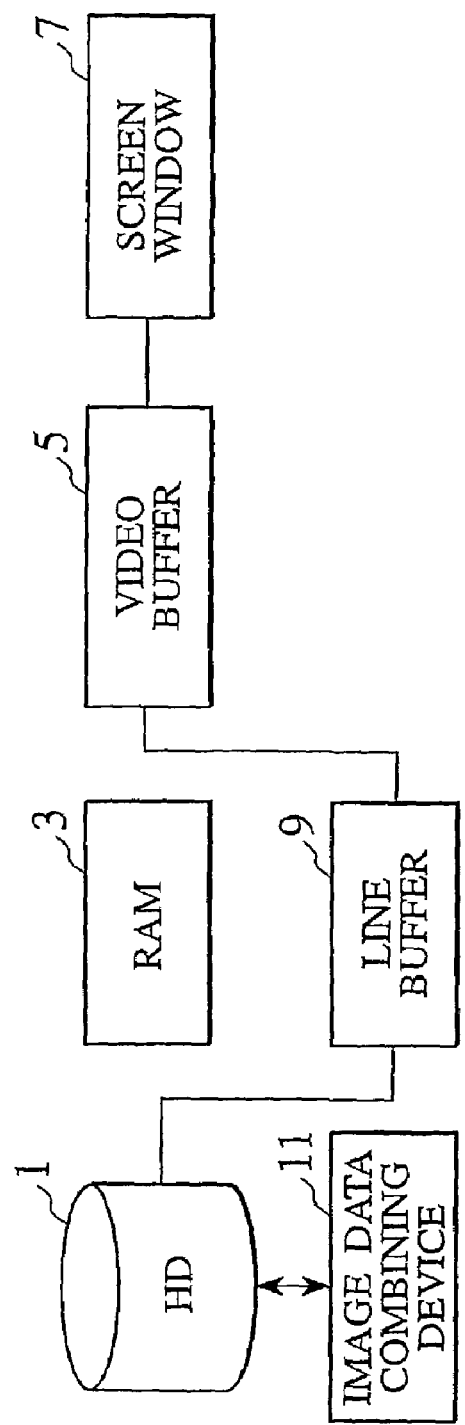
FIG. 9 shows an embodiment of the integrated image display system in accordance with the present invention.

As illustrated in FIG. 9, the integrated image display system is composed of a hard disk drive (1) for storing individual image data items and integrated image data, an image data combining device (11) for reading the individual data items and generating an integrated image data, a RAM (3) for temporarily storing the image data, a video buffer (5) for storing the image data before displaying the image data, and a screen window (7) for displaying the image data through a GUI. These elements, except for the line buffer (9) and the image data combining device, are well known in the industry and will not be described.

The image data combining device (11) combines individual data items based on how the items are related to each other. It first converts the file formats of the individual data items and integrates the converted individual data items. The line buffer (9) provides a path via which the image data is directly transferred to the video buffer (5). In order to make use of the line buffer (9) bypassing the RAM (3), the integrated image data is divided in a predetermined way. The integrated image data (110) is read on a unit-by-unit basis, wherein the unit corresponds to the capacity of the line buffer (9), before being transferred to the video buffer (5) through the line buffer (9). Specifically, an integrated image data (110) is divided into subdivisions either in row or in column and the subdivisions are read sequentially. The line buffer(9) stores one image subdivision.

FIG. 10 shows an embodiment in which an integrated image data (110) is generated by integrating individual data items (401, 403, 405 and 407) having the same file dimensions. The integrated image data (110) is divided either vertically or horizontally. As illustrated in FIG. 10, the integrated image data (110) can be divided into subdivided blocks taking advantage of the boundaries of the individual data items (401, 403, 405 and 407). However, the division could be arbitrary, i.e., irrespective of the individual data items. In the case that individual data items are not related to each other, it would be preferable to divide the image data at the boundaries between the individual data items.

FIG. 10 shows an integrated image data with four individual data items combined. The image is then divided into four subdivisions (110*a*, 110*b*, 110*c* and 110*d*). The display data (120), extending across three subdivisions (110*b*, 110*c* and 110*d*), is displayed in accordance with the method as illustrated in FIG. 3*c*.

FIG. 11 shows an embodiment in which an integrated image data (110) is generated by integrating individual data items (501, 503, 505 and 507) having different file dimensions. The integrated image data (110) can be divided into subdivided blocks at the boundaries between the individual data items (501, 503, 505 and 507). But it dose not have to be that way. The Figure shows a case where the single integrated image data (110) is divided into subdivided blocks at the boundaries. The individual data items (501, 503, 505 and 507) are divided into subdivisions (501*a*, 501*b*, 503*a*, 503*b*, 505*a*, 505*b*, 507*a* and 507*b*). The display data (120) is reproduced as a visual image in accordance with the process as illustrated in FIG. 3*c*.

Similarly, web pages of different dimensions can be combined. In the case where the web pages are in HTML format, the image data in the predetermined location cannot be obtained without parsing the entirety of the HTML page. In this case, the amount of HTML data to be loaded is reduced when making use of a HTML page that is partially parsed.

As described with reference to FIG. 5, users can easily and conveniently search desired data from an integrated image through the graphic interface in accordance with the present invention. The most significant characteristics introduced by the present invention reside in that it is possible to manipulate an integrated image with only a pointer (630) for pointing a location in the screen without particular manipulation of a menu key.

And, as described with reference to FIG. 6, a user is provided with a constant resolution of integrated images irrespective of the zoom ratio of images selected by the user of graphical information.

<Integrated Image Service Through Networks>

Figure 12:
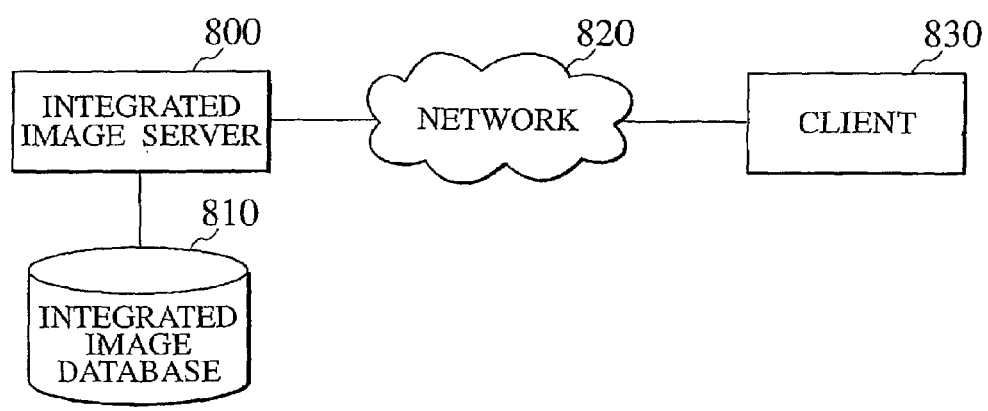
FIG. 12 is a flowchart showing the integrated image supply service through a network.

The present invention as described above can be used to provide users in remote sites with image supply services through a network. FIG. 12 is a schematic representation of the integrated image supply service through a network. As illustrated in the figure, in response to a request of a client (830) for integrated image data, the integrated image server (800) reads integrated image data from the integrated image database (810) and transmits it to the client (830) through a network (820). The network (820) includes the Internet. With conventional techniques, problems exists with the transmission of the integrated image data and with the processing power of the client computer (830) receiving the integrated image data because an integrated image data could be of a huge size. But, according to the present invention, because the client computer (830) would make use of the line buffer (9) rather than the computer's main memory (see FIG. 9), a low cost personal computer can be used. There is no transmission problem either because only data to be displayed would be transferred (corresponding to the size of the line buffer (9) as illustrated in FIG. 2) from the integrated image database (810) to the user. Similarly, the present invention can be effectively applied to provide a web service.

Web pages having different file dimensions are hyperlinked to each other so that, when the user selects a link, the linked web page is received. While the user can easily search desired information in the case where the web page hyperlinking is not complicated, it takes much time to search desired information if the linkage structure is complicated. This problem can be solved by integrating all the relevant web pages into a single image data. A practical embodiment of the service for combining web pages of different dimensions into an integrated image is illustrated in FIG. 11.

FIG. 13 is a block diagram showing an embodiment of a broadcast system utilizing the integrated image display system (903) in accordance with the present invention.

Image data of a newspaper is generated by the use of a scanner (901) and is stored in a hard disk drive (1) of the very high speed imaging system (903), (see FIG. 13). The broadcast presenter can provide integrated images through the interface provided by the integrated image system (903) and also through any other interface such as a touch screen (905) connected to the integrated image system (903). The integrated image display system (903) or the touch screen (905) is connected to a beam projector (907) that projects a portion of the image onto a screen. The screen image is taken by a camera (909) and provided to the audience through a broadcast system (911).

The system as illustrated in FIG. 13 constitutes a combination of a conventional broadcast system and the integrated image displaying system (903) in accordance with the present invention by means of the beam projector (907) and the camera (909). However, in accordance with another embodiment of the present invention, it is possible to directly provide the audience with the screen image reproduced by the integrated image displaying system (903) without intervention of the beam projector (907) and the camera (909). In this case, as illustrated in FIG. 12, the integrated image displaying system (903) can be connected to the broadcast system (911) through a network.

Typical examples of broadcast services making use of the integrated image display system as illustrated in FIG. 13 include weather forecast and newspaper summaries, which will be explained respectively in details.

In the existing broadcast systems, the newspaper summary service uses a camera to film a large board on which newspaper pages are attached. For a close-up, the cameraman has to manipulate the camera. Thus, it is difficult to make smooth transition to the next page, when compared with a variety of digital newspapers offered on the Internet. Also, when a close-up of a particular page is taken by a camera, it is impossible to provide the screen image which can be naturally scrolled in synchronism with the speed of reading the page.

The above-described problem of the conventional newspaper summary services can be solved with the inventive integrated image displaying system because a constant resolution can be provided irrespective of the zoom ratio of the screen image.

First, digital data containing newspaper information is generated, for example, by scanning the respective pages of a daily newspaper or by using existing digital data on the newspaper's web pages. In the case where the data is obtained by scanning, image data items would have the same page dimensions so that an integrated image data can be generated in accordance with the method explained in reference to FIG. 10 above.

Figure 14A:
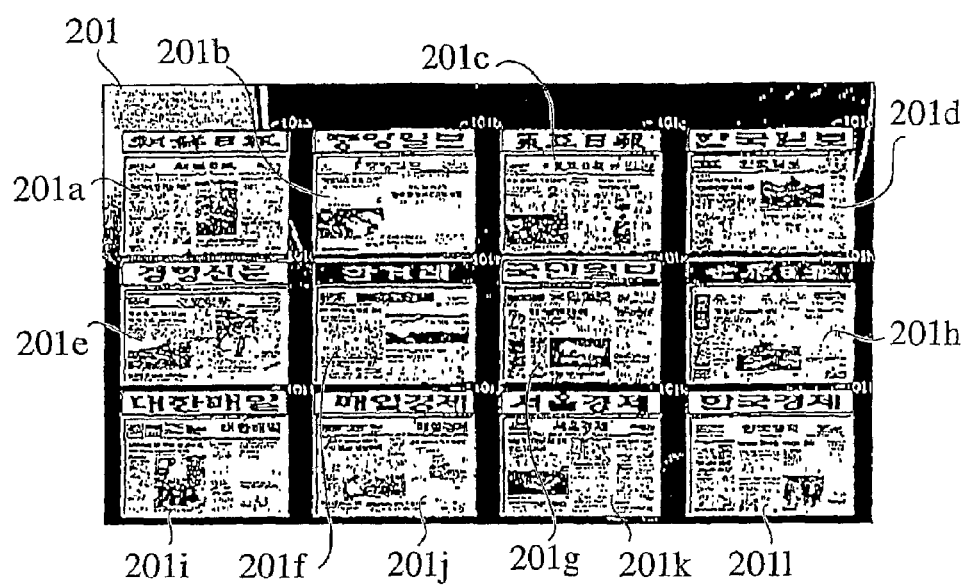
FIG. 14a is a schematic representation showing an embodiment of digital newspaper information service making use of the broadcast system in accordance with the present invention.

FIG. 14*a* shows the screen image integrated from the individual image data items. The integrated image data items of respective daily newspapers are shown in the respective inner windows (201a to 201l) and are in turn integrated as an integrated image data (201).

Now a news report can select one of the respective inner windows (201a to 201l) with a pointer (630) as illustrated in FIG. 5a or with a touch screen (905).

Figure 14B:
FIG. 14b is a schematic representation showing an enlarged screen image from an inner window, taking up the whole screen of digital newspaper information service making use of the broadcast system in accordance with the present invention.

FIG. 14b shows an enlarged screen image (201) from an inner windows (201a to 201l), taking up the whole screen. After selecting the inner window (201a), an article of the displayed newspaper page may be needed. Searching is implemented by means of the user interface provided by the integrated image displaying system (903). Namely, zooming and scrolling functions are performed by a straightforward manipulation of the pointer (630) as explained heretofore with reference to FIG. 5a or through manipulation of the touch screen (905) as explained heretofore with reference to FIG. 13.

Figure 14C:
FIG. 14c is a schematic representation showing a further zoomed view of the embodiment of digital newspaper information service making use of the broadcast system in accordance with the present invention.

FIG. 14c shows the screen image (201) that is a further zoomed view of the same newspaper page. And yet, the resolution of the screen image remains the same.

The screen image displayed in the inner window (201a) is then projected to a screen, which is captured by the camera (909) for broadcasting via the data transmission system (911). The zooming and scrolling functions are performed in the same area of the screen image (201) in response to selection by the broadcast presenter so that it is easy to advance a broadcast program without manipulating the camera and it is possible to provide the audience with a newspaper information service with more natural screen images.

The touch screen (905) or the integrated image display system (903) can be connected directly to the data transmission system (911). It is also possible to provide another service by processing the newspaper information in different forms in accordance with the present embodiment. For example, it is possible to provide a newspaper information service by combining newspaper information given in HTML or PDF into a single integrated screen.

The broadcast system as illustrated in FIG. 13 is applicable to a weather forecast service. Conventional weather forecast services provide weather information in charts or video by processing data transmitted from satellites. However, the amount of data is huge and actual satellite photographs cannot be used directly, so that the screen image is displayed after reducing the data by appropriate signal processing.

As a result the images are rough or grainy. Particularly, in the case of a video image showing the direction of clouds, typhoon and so forth, these weather phenomena do not look natural. This problem can be easily solved by making use of the integrated image display system (903) as illustrated in FIG. 13. Namely, the integrated image display system (903) generates image data and quickly reproduces it so that it is possible to provide video and fine weather images as naturally as possible.

The video and still images of weather reproduced by the integrated image displaying system (903) are sent directly to the broadcast system (911) to combine with the screen image of the weather caster generated by a camera.

[System for Displaying Data Files]

(Overall Configuration of the System for Displaying Data Files)

Figure 15:
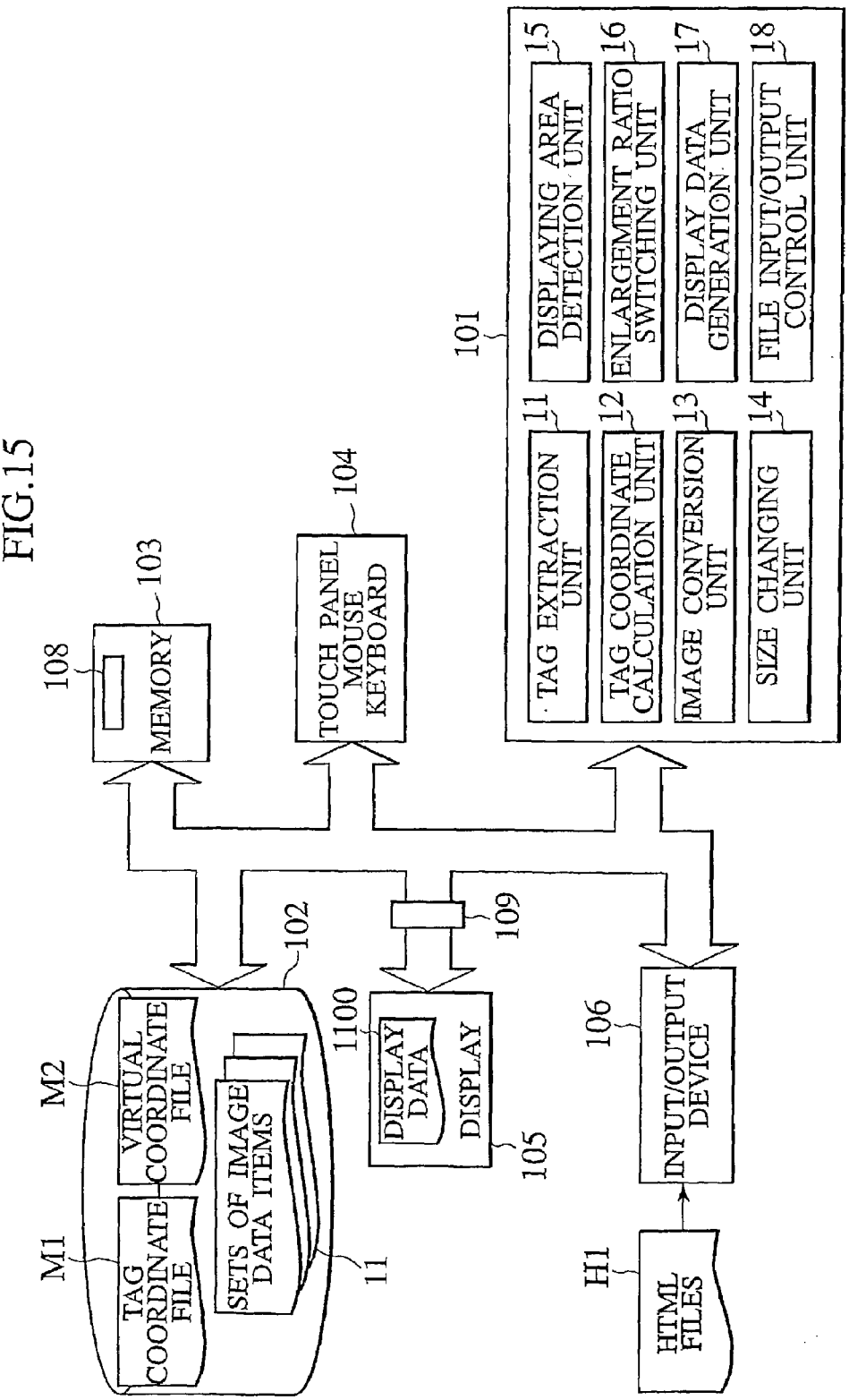
FIG. 15 is a block diagram showing the system for displaying images in accordance with an embodiment of the present embodiment.

As illustrated in FIG. 15, the image displaying system in accordance with the present embodiment is composed of an input/output device (106) for performing input/output operations of data files; a hard disk drive (102) for storing data; a memory (103) for temporarily storing data; a display device (105) such as a CRT; a liquid crystal panel; console devices such as a touch panel, a mouse, a keyboard and so forth; a CPU (101) for performing a variety of arithmetic operations with which the respective functions are implemented; a line buffer (108), and a video buffer (109).

The input/output device (106) is an interface through which the present system performs input/output operations of files and data, e.g., a floppy disk drive, a CD-ROM disk drive, a DVD-ROM disk drive, and so forth. In the case of the present embodiment, HTML files are input/output as a data sources for conversion.

The hard disk drive (102) serves to store computer programs such as a file conversion program, a program for displaying images and the like, HTML files read from the input/output device (106), and files generated as a result of the execution of system services.

The memory (103) is used in the present embodiment to store image files as read out to be displayed and to output data to be displayed corresponding to the display area to the display device (105).

The console device (104) may be a touch panel, a mouse, and a keyboard through which commands are input to convert a file and display images. In the present embodiment, the console device (104) is a touch panel equipped with a liquid crystal panel in the display device (105).

In the case of the present embodiment, the display device (105) is a liquid crystal panel through which the file conversion program and the character display are controlled. The front surface of the display device (105) is implemented with a transparent touch panel (the console device (104)) with which several commands can be input by touching the indication symbols on the display device (105).

The CPU (101) serves to execute several functions by loading executable programs from the input/output device (106), the hard disk drive (102), and memory (103). The program consists of a tag extraction unit (11), a tag coordinate calculation unit (12), an image conversion unit, a size changing unit (14), a display area detection unit (15), an zoom ratio switching unit (16), a display data generation unit (17), and a file input/output control unit (18).

The tag extraction unit (11) serves to parse the text contents of an HTML file (H1) in order to extract tag data containing modifier information.

The tag coordinate calculation unit (12) serves to convert the location of the extracted tag data into screen coordinates and write the result to a tag coordinate file through the file input/output control unit (18).

The image conversion unit (13) serves to convert data files such as HTML files to image files such as JPEG files, and bit map files.

The size changing unit (14) serves to generate a set of image data items (image data items in hierarchies) corresponding to each of the respective zoom ratios by expansion or compression. Meanwhile, in accordance with the present embodiment, the size changing unit (14) also serves to calculate the locations of the image data items corresponding to the respective zoom ratios in virtual coordinates and write the result to the virtual coordinate file.

The display area detection unit (15) serves to receive inputs from the user of the console device (104) such as the touch panel to determine which virtual layer to be displayed, and to calculate the range of the virtual layer to be displayed on the screen.

The zoom ratio switching unit (16) serves to detect the change in the zoom ratio in response to the user's inputs, and switches the zoom ratio of the image data being displayed by changing the virtual layer.

The display data generation unit (17) serves to calculate the range of virtual coordinates to be displayed on the display device (105) to determine which image data items in hierarchies correspond to the range to be displayed, load the image data items into the line buffer (108) of the memory (103), and generate display data (I100) by transferring the portion of the image data that is actually displayed in the screen to the video buffer (109). When pluralities of image portions are to be displayed, they are reassembled in accordance with the virtual coordinate file (M2) to generate a single display data (I100).

The file input/output control unit (18) serves to read and write the files stored in the hard disk drive (102) as the user requests each units.

The line buffer (108) serves to temporarily store the image data on each line as read from the hard disk drive (102). In accordance with the present invention, this line buffer (108) is formed by allocating a certain region in memory (103). Also, the line buffer (108) can have a variable size depending upon the size of the image data on each line to be read out at a time. Furthermore, if necessary, a plurality of line buffers (108) can be allocated in memory (103). Also, the line buffer (108) may be implemented separately from main memory (103).

The video buffer (109) is provided for temporarily storing an image to be displayed on the display device (105). A single image is constructed in the video buffer (109) by assembling image data items on each lines for output to the display device (105). While the video buffer (109) is provided separately from the display device (105) in accordance with the present embodiment, the video buffer (109) can be implemented within the display device (105) or as a certain region in memory (108).

(File Conversion Process)

The process of generating image files for display by the image display system will be explained in the following description. FIG. 16 is an explanatory view for schematically showing the file conversion process. The example below explains a case where a text file with tags (HTML) is converted into hierarchical image data items in JPEG, bit map, or other formats.

First, as illustrated, the HTML file (H1), used as a data source of conversion, is parsed in order to generate hierarchical image data items (I1 to I3) having a plurality of image dimensions. The hierarchical image data items (I1 to I3) are converted into bits (pixels) to form part of an image that include the text data (such as letters, symbols and the like contained in the HTML file (H1)) as well as the image files included in the text through hyper-links.

Also, the HTML file (H1) includes, besides a written text, tags as linking information to other files (e.g., "<A HREF="http://*.**"></A>" as illustrated in FIG. 10). In the file conversion process in accordance with the present embodiment, the linking information included in the written text is extracted. The extracted URLs and their coordinates and ranges in the hierarchical image data items are then stored in the tag coordinate file (M1).

The location and the range of each link are converted to a location in the image data and stored in the tag coordinate file (M1) along with the linked URLs according to the ranges of the mappings.

When the HTML file (H1) is converted into image files of different file dimensions, the locations of the image data items as converted in the virtual coordinates, which are constructed by combining the respective hierarchical image data items are stored in the virtual coordinate file (M2).

The sets of image data items (I1 to I3) at various zoom ratios, the tag coordinate file (M1), and the virtual coordinate file (M2) are generated in this manner and stored in the hard disk drive (102).

Meanwhile, the image files corresponding to each size are divided in the direction perpendicular to the direction of reading out the constituent pixel data and stored as a plurality of divided image data items in the hard disk drive (102). When the image files are read out from the hard disk drive (102), their respective divided image data items are read out.

(Image Displaying Process)

The set of image data items as converted by the file conversion process as explained above can be browsed by the image display process as explained in the following description. In this case, it is assumed that the data files have already been converted into their respective hierarchical image data items stored in the hard disk drive (102).

First, the data file set to be displayed by the user is selected in the console device (104). The selected virtual coordinate file (M2) and the tag coordinate file (M1) corresponding to the data file are read from the HDD (102).

When reading the virtual coordinate file (M2), a hierarchical image data item set having the lowest zoom ratio 6.25% is put in the virtual layer (L3) and displayed for viewing in the display device (105). The system then waits for user input to change the zoom ratio, to move the range to be displayed and so forth.

Figure 17A:
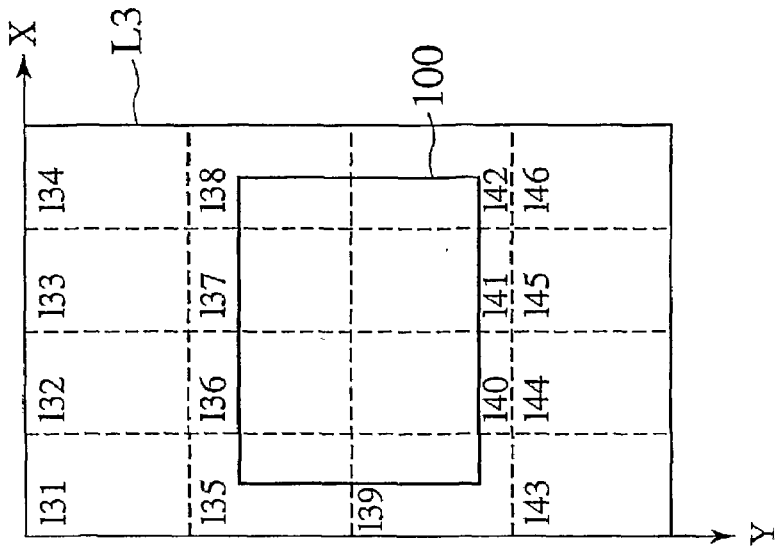
FIG. 17 is an explanatory view for schematically showing the process of displaying data files in accordance with an embodiment of the present invention.
Figure 17B:
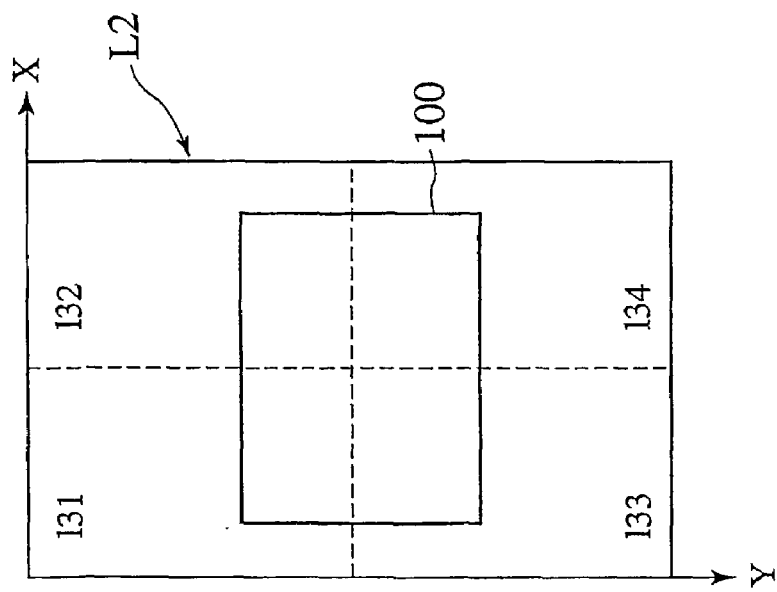

The display area detection unit (15) serves to detect user input to the console device (104). If the zoom ratio (the reduction ratio or the expansion ratio) needs to be changed, the detection unit determines the virtual layer and the virtual coordinates on the virtual layer. For example, when the user requires a 125% zoom, the virtual layer (L2) is selected as illustrated in FIG. 17(a).

Then, the hierarchical image data items included in the range to be displayed as required by the user is selected on the virtual layer. For example, when the user requires the display range (100), the hierarchical image data items (I31 to I34) relating to the display range (100) are selected. The hierarchical image data items (I31 to I34) as selected are temporarily stored in the memory (103).

The image portions actually falling within the display range (100) is generated as the display data. Specifically, the display data generation unit (17) serves to clip the image portions to be displayed from the hierarchical image data items (I31 to I34) stored in the memory (103) and to reassemble the image portions based on the virtual coordinate file (M2) by means of the CPU (101) in order to generate the display data (I100).

When the display data (I100) is generated, the linking information as described in the tag coordinate file (M1) is obtained together with the location of the links (the mapping information) in the image followed by introducing the linking function in the display data (I100).

Thereafter, the display data (I100) as generated is output to the display device (105) to display the display range (100) as an image on the screen. The display data (I100) as displayed is implemented with links so that it is possible to jump to the linked files and the linked web sites by touching the touch panel (104) on the display device (105).

After displaying the display data (I100), the display area detection unit (15) waits for new inputs from the user to manipulate the image.

When the user requires 6.25% zooming out, the zoom ratio switching unit (16) switches to the virtual layer (L3) and reads the hierarchical image data items I35 to I42 matching the display range (100) from the memory (103) with reference to the virtual coordinate file (M2). The zoom ratio switching unit reads the portion of the image data that is actually displayed to screen by CPU (101) operation in order to generate the display data (I100) for the display device (105).

(Data File Conversion Program and Display Program)

The data file displaying system as described above can be implemented in a general purpose computer such as a personal computer by running a data file conversion program and a display program as explained in the following description. These programs may be stored in floppy disks, a CD-ROM, a DVD-ROM or another computer-readable medium, and installed in a general purpose computer from these mediums.

Figure 18:
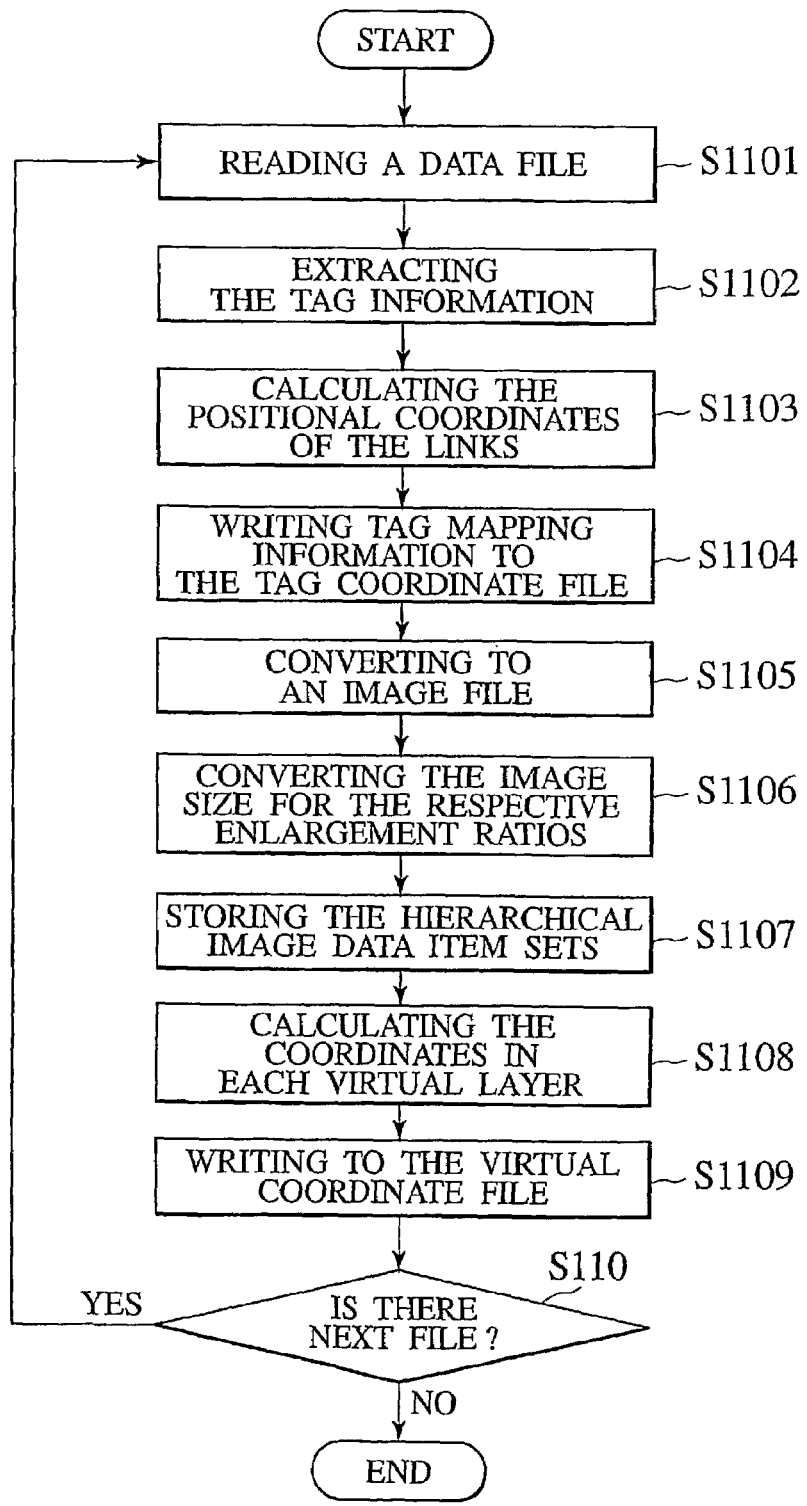
FIG. 18 is a flowchart showing the procedure for converting data files in accordance with an embodiment of the present invention.

First, the configuration of the data file conversion program will be explained. FIG. 18 is a flowchart showing the procedure for the data file conversion program in accordance with the present embodiment.

First, the HTML data file (H1) to be converted is read from the input/output device (106), the hard disk drive (102) and the like to the CPU (101). Meanwhile, if the file size of the HTML file (H1) is too large to be transferred to the CPU (101) at one time, the HTML file (H1) is saved in memory (103) or the hard disk drive (102) functioning as virtual memory and, when required, transferred to the CPU (101).

Next, the tag extraction unit (11) serves to extract the tag information from the HTML file (H1). After the tag information (the linking information) is extracted, the positional coordinate where the each tag information items is displayed is calculated by means of the tag coordinate calculation unit (12) in order to generate the mapping information. Then, the coordinates information including tag mapping information is written to the tag coordinate file (M1).

The HTML file (H1) is then converted to an image file such as a JPEG file, or a bit map file (S1105), which is then reduced or expanded to have different image sizes in order to generate a plurality of hierarchical image data items (S1106). The generated hierarchical image data items are stored in the hard disk drive (102) (S1107).

In step (S1107), the hierarchical image data items are divided in the direction perpendicular to the direction of reading out the constituent pixel data and stored as a plurality of divided image data items.

Virtual layers are then generated for each zoom ratio followed by calculating the positional coordinates of their respective hierarchical image data items in each virtual layer (S1108) and writing the calculation results to the virtual coordinate file (S1109).

Thereafter, it is judged whether or not there is another file to be displayed together (S1110). If there is another file, the, procedure is returned to step (S1101) to repeat in steps (S1102) to (S1109) as described above. When there is no further file, the process is terminated.

Figure 19:
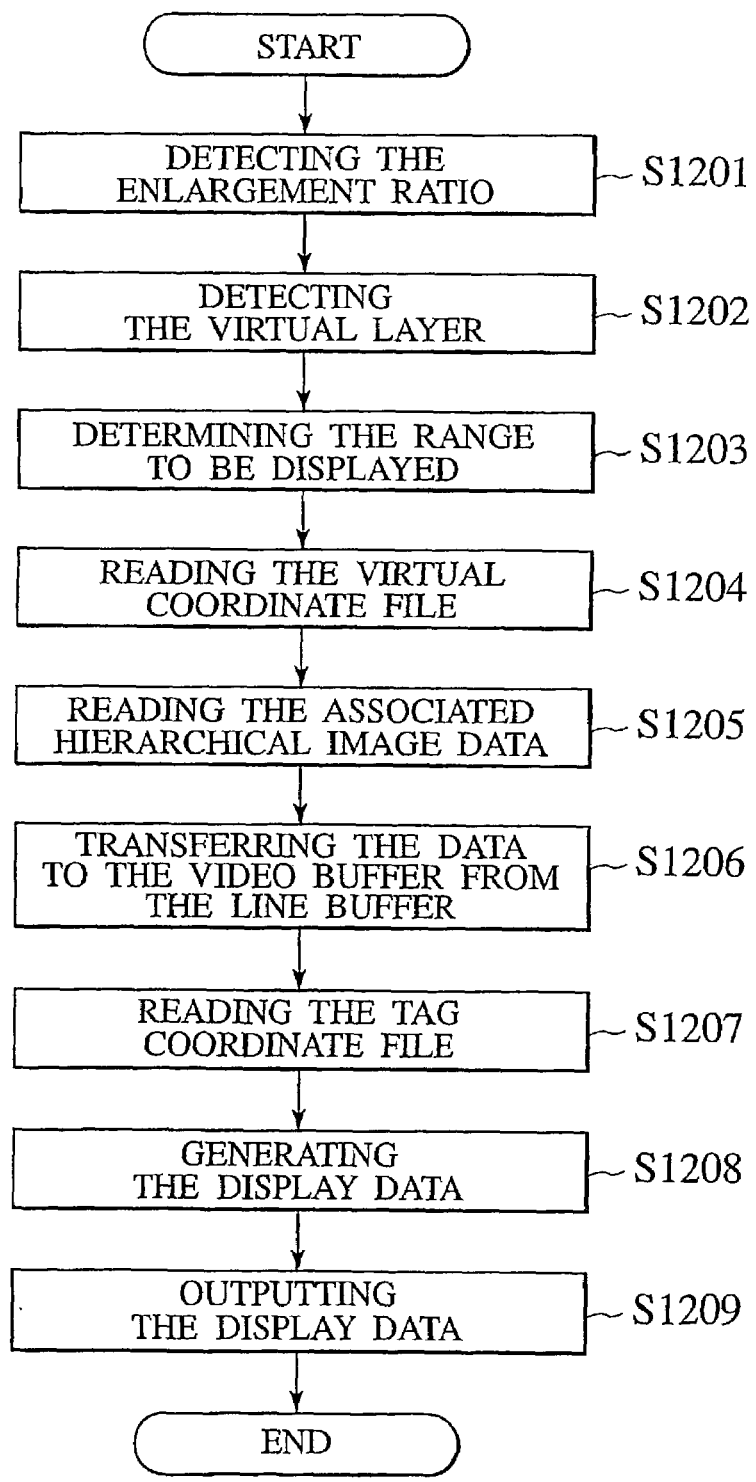
FIG. 19 is a flowchart showing the procedure for displaying data files in accordance with an embodiment of the present invention.
Figure 20D:
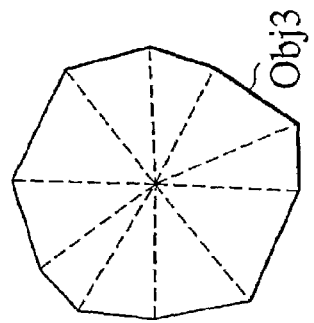
FIG. 20 is an explanatory view showing an exemplary modification in accordance with the present invention to explain how to insert data items into the image data.
Figure 20B:
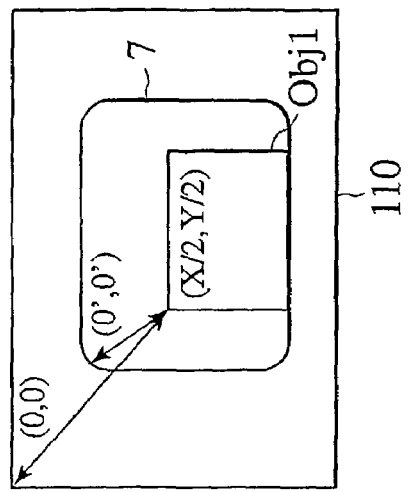
Figure 20C:
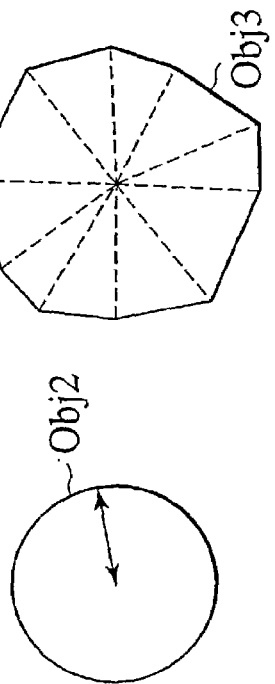
Figure 20A:
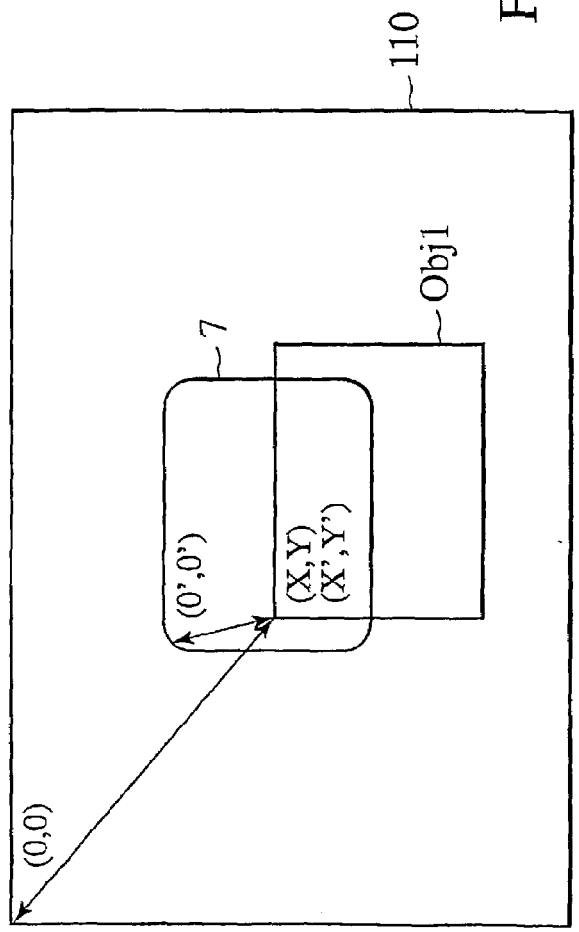

The respective hierarchical image data item set as generated in this manner can be browsed by the data file display program as explained in the following description. FIG. 19 is a flowchart showing the procedure of the data file browsing program in accordance with the present embodiment. It is assumed that the user specifies the set of data files for display.

First, the display area detection unit (15) serves to detect user inputs from the console device (104) and changes to the zoom ratio of the images to be displayed (S1201). The zoom ratio switching unit (16) serves to determine the virtual layer to be displayed (S1202). Also, at this time, the range to be displayed is determined (S1203) while reading the virtual coordinate file (M2) (S1204) and calculating the coordinates corresponding to the display range.

Next, the hierarchical image data corresponding to the display range is divided and sequentially read from the hard disk drive (102). In this case, the hierarchical image data items are read out by sequentially reading out the respective divided image data items unit-by-unit corresponding to the length of the LINEs.

The data as read is accumulated in the line buffer (108) (S1206). When the line buffer (108) is filled to a predetermined size, the divided data item is transferred to the video buffer (109).

Next, the tag coordinate file (M1) is read (S1207).

The image portions corresponding to the display area are read out from the video buffer (109) and assembled with reference to the virtual coordinate file to generate the display data by adding modifier information such as link information thereto. The display data as generated is output to the display device (105) and displayed on the display device (105), followed by terminating the process.

Meanwhile, when changing the zoom ratio or the range of the images to be displayed, steps (S1201 to S1209) are repeated to determine the hierarchical image data items corresponding to the display area with reference to the virtual coordinate file and switch the display image.

As described above, while the data file display program and the data file conversion program are described as separate programs in the case of the present embodiment, the present invention is not limited to this configuration and it is possible to design both programs in communication with each other, e.g., by designing the data file conversion program as a subroutine of the display program. For example, when another data file to be displayed is added, the data file conversion program is automatically started in order to generate hierarchical image data items which can be displayed.

(Action and Advantages of the Data File Display System)

In accordance with the apparatus for displaying images of the present embodiment as described above, a single data file is converted into data items of a plurality of different image sizes that are arranged into virtual layers, which are selectively displayed when the zoom ratio of the image to be displayed is changed to avoid lowering the resolution of the image when changing the zoom ratio.

Also, in accordance with the present embodiment, the image data is stored beforehand in memory (103) so that it is possible to quickly display the image even when the display range is moved, resulting in improved performance.

Furthermore, even if the data file to be displayed is such as an HTML file which is formed in accordance with a file format including modifier information in terms of tag data, the functions of the modifier information are associated with the coordinates in the image data after conversion and are stored in the tag coordinate file, with reference to which the modifier information is restored in order to avoid loss of the functions which the data file has been given.

Furthermore, in accordance with the present embodiment, the console device (104) is implemented as a touch panel attached to the display device (105) so that it is possible for the user to perform movement, zoom and other handling operations of the displayed file by using a finger, a touch pen and the like. The user can therefore understand the operations intuitively substantially improving operability.

[Exemplary Modifications]

The following modifications are possible in the case of the systems and methods as described above in accordance with the present invention.

(Exemplary Modification 1)

The image data (110) which is displayed in the system above can be implemented with the inserted data item Obj1 as illustrated in FIG. 20.

It is desirable that the divided image data items are provided in the format in accordance with the present embodiment. In this format, the location and the size of the inserted data item in the image can be described as (x, y), (x, y and r) and so forth so that coordinate information calculation on the image is easy.

The object Obj1 can be a rectangular object as illustrated in FIG. 20($a$), a circular object (object obj2) or an arbitrary object (object obj3), as expressed as a combination of polygons as in FIG. 20($c$) and FIG. 20($d$). In an image formatted in accordance with the present embodiment, the location of object obj2 can be specified by the coordinates (X,Y) and the radius (r) from the center position in order to determine the location and the profile (size). Furthermore, these inserted data items Obj1 to Obj3 are associated with the coordinates (X,Y) in relation to the origin (0,0) of the image data (110) and with the coordinates (X',Y') in relation to the origin (0',0') of the display screen window (7).

By this configuration, even when the zoom ratio of the image data is changed by accessing the image data at a different virtual layer, it is possible to calculate the location of the inserted data item Obj1.for that layer. For example, when the zoom ratio of the image data is set to ½, it is easy to calculate the addresses by halving the respective values of the coordinates (X,Y) in relation to the origin (0,0) of the image data (110).

Also, it is possible to judge whether or not the inserted data item is included in the display screen window by calculating the coordinates in relation to the display screen window (7). For example, the entirety of the inserted data item is not displayed in the case where the coordinates (X',Y') of the display screen window (7) are negative values. Additionally, only the portion of the inserted data item with positive coordinates is displayed on screen. If the inserted data item is a motion picture that is completely outside the, screen display area, the processing operation of reading out the motion picture is turned off.

(Exemplary Modification 2)

By the use of the present invention, it is possible to convert Web pages as distributed via the Internet to image items and display the image items as a single page as illustrated in FIG. 21. The Web pages hierarchically linked by the embedded tag data In the case of the present invention, the image items having been converted are arranged in accordance with the hierarchical structure. As a result, it is possible to move one Web page to another Web page by scrolling and to browse Web pages without awareness of the hierarchical structure.

In the case of the present exemplary modification, a bookmark function is provided for the purpose of maintaining a history of browsed contents. Namely, bookmarks BM1 and BM2 are set in the locations selected in pages P1 and P2 which have already been browsed. A bookmark can be recorded as tag data in the image data (110) or within a separate file provided for recording bookmarks.

It is also possible to provide functions to search a bookmark, that is, to sequentially backtrack to prior bookmarks in the browse history.

Furthermore, as illustrated in FIG. 21, it is possible to link a Web page through the Internet with an integrated data file which is generated by converting the originals into image data items as reduced, and arranging the reduced image data items as combined data in the form of a two dimensional array. More specifically speaking, an index image as illustrated in FIG. 21 is generated and stored in a hard disk drive by converting HTML files provided through the Internet into image data files and physically or logically combining the converted files. The index file as generated is read out from the hard disk drive and displayed on a display device as indices.

The respective images constituting the indices are given links to URLs of the Internet where the original data items are provided. The information required for generating the respective links are described as tag data in a tag coordinate file which is provided separated from the index file.

When one reduced image of the indices is clicked, the tag coordinate file is accessed in order to jump to the corresponding Web page in accordance with the tag data described in the tag coordinate file. The corresponding Web page as reached is displayed as a usual HTML file by a conventional browser program.

Meanwhile, also in this case, a bookmark function is provided for the purpose of recording a Web page which has been browsed. Namely, a bookmark is set to the reduced image of a Web page which have been already browsed. A bookmark can be recorded as tag data in the image data or within a separate file provided for recording bookmarks.

In accordance with the present exemplary modification as described, it is easy to visually recognize Web sites in a hierarchical structure provided on the Internet by browsing the index file. Since the index file is stored in a hard disk drive located inside of the system, the index file can be quickly read out and displayed. On the other hand, it is also possible to browse a latest Web page on the Internet by jumping to the page with reference to the links attached to the index file.

(Exemplary Modification 3)

In accordance with the present invention, an image can be displayed with a fixed cursor (155) as illustrated in FIG. 22.

The location of the fixed cursor (155) is located at the center position of the screen window (7) and shall not be moved from the center position of the screen window (7) even when the image is scrolled on the display screen window.

In this case, the image can be scrolled with a ten key pad (104$a$) as illustrated in FIG. 22$a$. By pressing one of a direction keys, the fixed cursor (155) is not moved in relation to the display screen window but the image is scrolled in the direction opposite to the direction of the pressed key. For example, when the user moves the cursor to the top left direction by pressing a ten key (104$b$) in order to relatively move the object obj4 to the center of the display screen window, the image data (110) is moved to the bottom right direction so that the object is moved to the location of the fixed cursor (155) as illustrated in FIG. 22($b$).

In this event that the object obj4 is located at the fixed cursor (155), the coordinates of the object obj4 are obtained on the display screen by clicking or pressing the return key in order to perform a particular operation (for example the expansion, the reduction and the like) at the coordinates.

In this case, it is possible to align the fixed cursor (155) with the object obj4 only by specifying the direction to the location of the object obj4. As a result, the object on a huge image can be easily located.

(Exemplary Modification 4)

With the image data (110) displayed in the system in accordance with the present invention, it is possible to create data for an original album by clipping an arbitrary image portion and pasting the image portion to another file as illustrated in FIG. 23.

In this case, a mouse is used to select a region (154) of an arbitrary portion (the object obj5 in the figure) of the image displayed by connecting the divided image data items F1 to F4, and by clipping the select portion from the set of divided image data items. The image portion as clipped is temporarily stored in the memory (103) and then pasted to an album file M3. The image data igm1 including the object obj5 is attached to the album file M3 thus generated.

When the album file M3 is saved, the image data img1 is not actually stored; only the file names of the divided image data items F1 to F4 associated with the image data img1 is recorded in a layout file (a record file) together with the coordinates (X,Y) specifying the region of the image in the divided image data items and image area specifying data relating to the profile of the image.

If the album file M3 as stored is displayed again, it is displayed by reading a layout file M4 and the divided image data items F1 to F4 as included.

Meanwhile, if the divided image data items F1 to F4 are deleted in spite of the existence of the album file M3, the necessary portion of the divided image data items have to be stored in another new image data file. In this case, the file name of the divided image data items F1 to F4 recorded in the layout file M4 are deleted. New image data files have to be generated and their names are recorded in the layout file. By this configuration, even if the album file is browsed after deleting the divided image data items, the image data img1 is preserved.

Desired image portions can therefore be collected into a single file. Also, when the album file M3 is stored, only the file names of the divided image data items F1 to F4 rather than the data items themselves are stored in the layout file M4 so that it is possible to dispense with storing redundant image data having the same contents and thereby reduce the amount of data.

(Exemplary Modification 5)

In accordance with the present invention, a book can be distributed as image data through the Internet.

Figure 24:
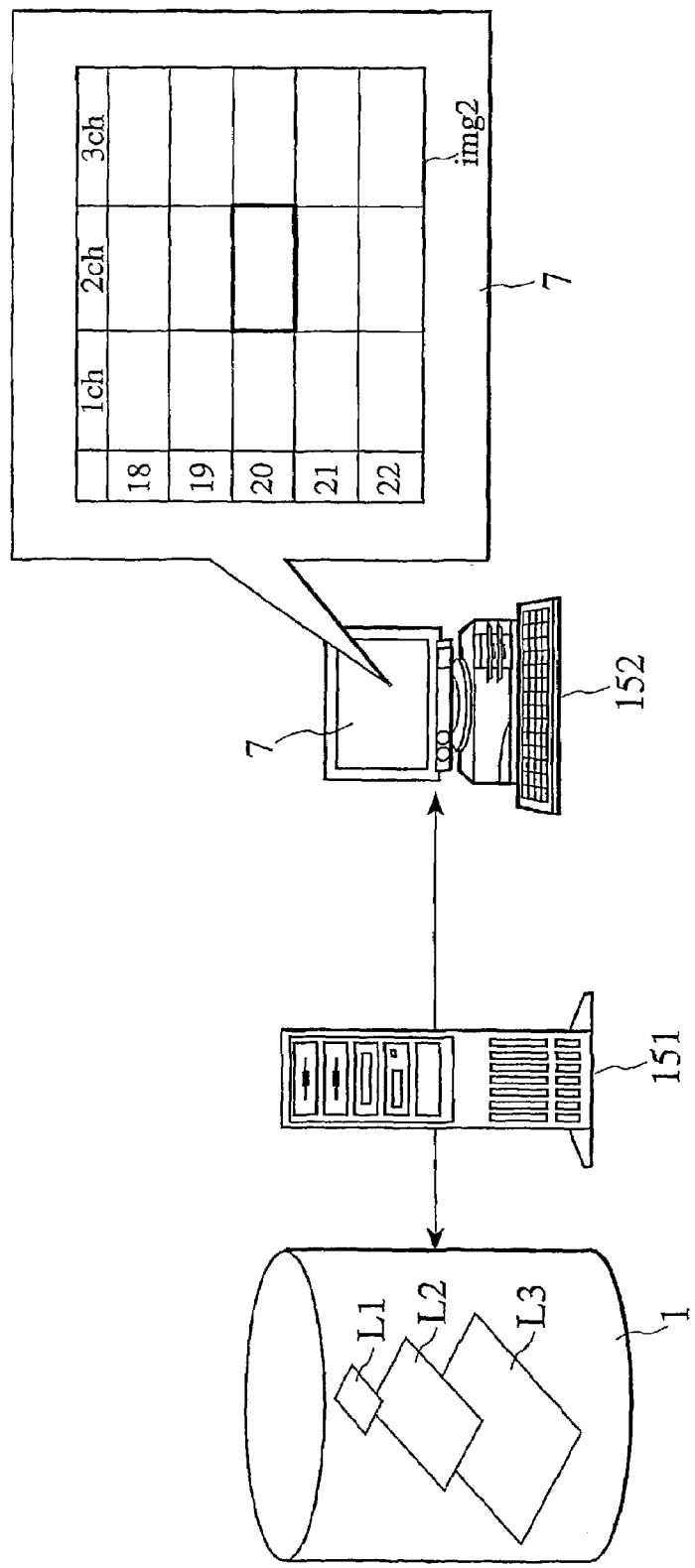
FIG. 24 is an explanatory view showing an exemplary modification in accordance with the present invention for explaining the method of distributing books through the Internet.

For example, as illustrated in FIG. 24, the image data is distributed to a personal computer (152) of the user from a distribution server (151) which is connected to the Internet and equipped with the hard disk drive (1) that contains the divided image data items.

In this case, while the image data is composed of the hierarchical image data items L1 to L3 at various zoom ratios, the distribution server (151) serves to transmit data corresponding to the zoom ratio requested by the user through the distribution network.

The image data is generated by converting the respective pages of a book to image data items and combining them into a flat image so that a previous page can be viewed directly by scrolling. Also, the respective hierarchical image data items are given the coordinates corresponding to the respective pages and the respective line numbers of the book. When a user specifies a desired page and a desired line number of the book by clicking a point on the image of the book displayed on the display screen, the distribution server serves to transmit the expanded data of the desired page in response to the request of the user.

In the case of the example as illustrated in FIG. 24, a television schedule table is distributed as image img2 in which the ordinate shows broadcasting times and the abscissa shows channel numbers.

The distribution server (151) serves to transmit information for the channel and time selected by the user by clicking a position in the television schedule table img2 displayed in the screen window (7). The title of the program as selected is specified with reference to the channel and time in the distribution server (151), which then transmits the detailed information about the program and the corresponding motion picture data as the content thereof to the personal computer (152) as the required content.

Furthermore, the books distributed may also include commodity catalogs such as those of telemarketing services and the like besides television schedule tables. In this case, the coordinate information of the divided image data items are associated with the page numbers and the screen coordinates of the page numbers of a commodity catalog so that a page number and the associated coordinates are transmitted to the distribution server (151) in order to specify a particular commodity in the catalog with reference to the page number and the associated coordinates.

The distribution server (151) serves to transmit the detailed information about the commodity as specified to the personal computer (152) and to manage delivery thereof.

(Exemplary Modification 6)

In accordance with the present invention, a motion picture can be presented by sequentially displaying a plurality of divided image data items. Namely, as illustrated in FIG. 25(a), an animation is displayed by sequentially displaying divided image data items containing slightly different images and belonging to one of the divided image data groups MOV1 to MOV3 each composed of divided image data items having the same data size.

In this case, the order of displaying the divided image data groups MOV1 to MOV3 can be specified or modified by manipulating a pointing device (motion picture handling means) such as a touch panel (104c), a mouse (104d). For example, as illustrated in FIG. 25(b), forwarding or reversing the motion picture is possible by laterally moving a finger on the touch panel (104c) while the speed of the animation can be changed by changing the speed of finger movement. Also, by vertically moving a finger on the touch panel (104c), the layer of the image is switched in order to change the zoom ratio of the animation as displayed.

Meanwhile, similar manipulations are possible by lateral or vertical motions of a mouse (104d).

(Exemplary Modification 7)

Figure 26:
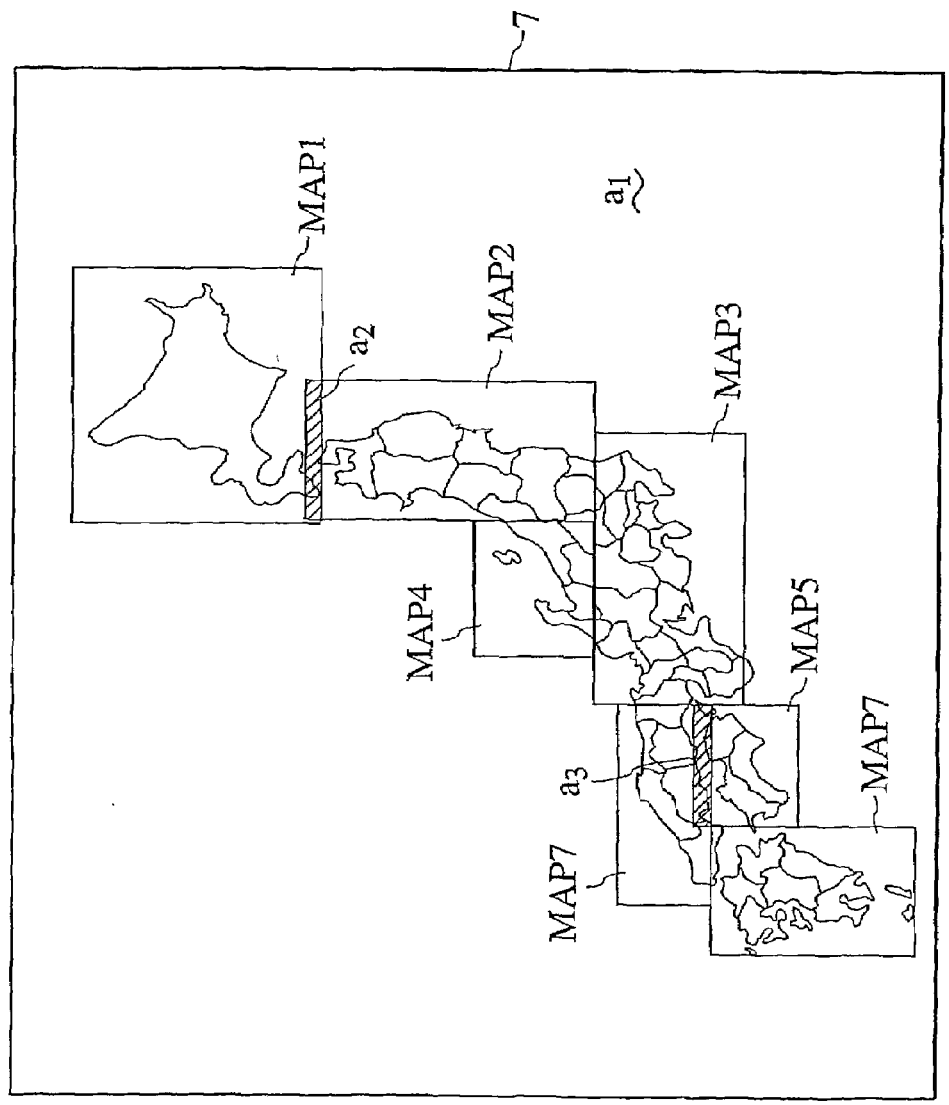
FIG. 26 is an explanatory view showing an exemplary modification in accordance with the present invention in which a map is handled as the image data.

In accordance with the present invention, image data can apply to the display of large area as in a map or in a celestial image as illustrated in FIG. 26. Also in this case, an arbitrary area can be enlarged by generating hierarchical image data items corresponding to different zoom ratios.

Meanwhile, when the image data is prepared to display a large area such as a world map, only select sites are generated in accordance with the present invention because geographical data with the same detail is not available for the entire world. Namely, in the case of a Japanese map as illustrated in FIG. 26, image data of the land areas is generated, while generating no detailed map of extraneous areas, i.e., the sea area (a1).

Also, since the image data includes large parts of undesired sea area (a1) if the whole of Japan is displayed in a single image, the Japanese territory is divided into a plurality of areas in agreement with the profile of Japan followed by generating image data items MAP1 to MAP7 for each area. In this case, the sizes of the image data items MAP1 to MAP7 can be arbitrarily determined. Meanwhile, the respective image data items can be overlapped with each other as illustrated with areas (a2) and (a3). When overlapped, the image loaded last is displayed.

Also, in this case, the sea area (a1) is filled with a predetermined dummy data (for example blue). It is thereby possible to dispense with unnecessary image data and therefore reduce the size of data.

(Exemplary Modification 8)

Figure 27:
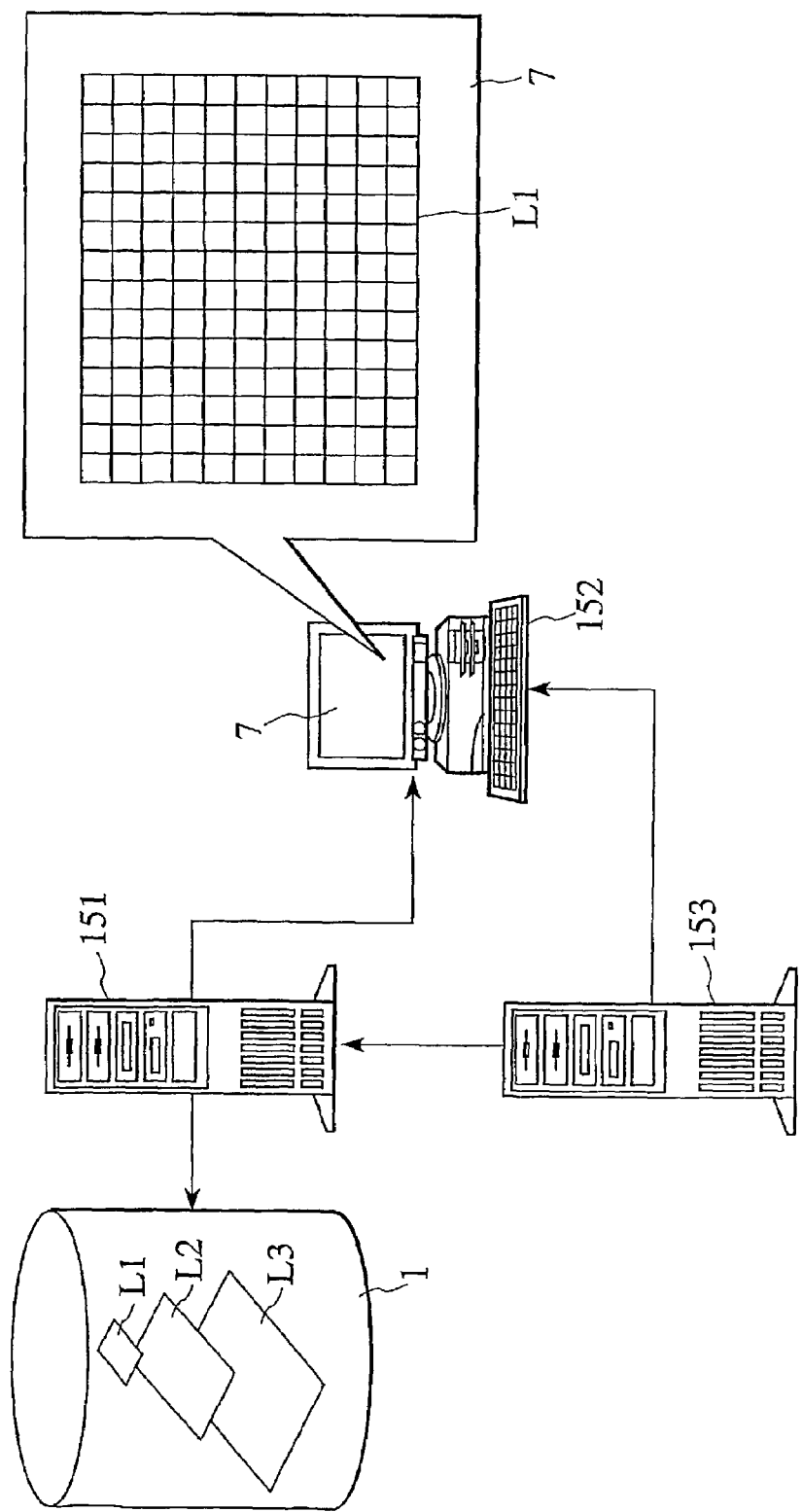
FIG. 27 is an explanatory view showing an exemplary modification in accordance with the present invention for explaining the method of distributing images and motion pictures through the Internet.

In accordance with the present invention, image data can be sold through the Internet. As illustrated in FIG. 27, image data is distributed to a personal computers (152) of the user by a distribution server (151) which is connected to the Internet and equipped with the hard disk drive (1) containing the image data (the divided image data items, the hierarchical image data items and so forth). Also, a payment server (153) is connected to the Internet in order to receive payment from the user through the Internet.

First, a free image L1 at the lowest zoom ratio is provided as an index for the user to browse on the screen window (7) of his personal computer (152). The image L1 shows a table of images with which the users can look through the collection of still images and the motion pictures in view. A user selects a desired image(s) and sends a request for it to the distribution server (151).

When receiving the request, the distribution server (151) sends a request to the payment server (153) in order to activate the payment procedure. In response to this, the payment server (153) sends a request for payment to the user. The user makes payment, for example, by transmitting his credit card number and the like to the payment server (153).

After completing the payment, the payment server(153) informs the distribution server (151) that the payment transaction is complete. The distribution server then (151) transmits to the user an image L2 or L3 at the higher zoom ratio.

By this procedure, the user can select an image he wants to purchase so that it is possible to realize a safe e-commerce environment.

INDUSTRIAL APPLICABILITY

In accordance with the integrated image displaying system of the present invention, it is possible for users to easily search information by arranging related data items into a single integrated image. Also, the user can conveniently search information inside the integrated image by having a GUI design based on human intuition. In accordance with the integrated image system of the present invention, it is possible to quickly reproduce integrated images, to provide natural movement of images and to provide the same resolution even when the zoom ratio of the screen image is increased in the act of searching for detailed information. The integrated image system in accordance with the present invention is applicable to a broadcast service, making it possible to provide newspaper information and satellite information in a natural manner.

Also, utilizing the data file browsing program, the data file conversion program, and the data file browsing device of the present invention, one can maintain the same resolution regardless of zoom ratio.

In Summary, this invention represents a revolutionary approach to browsing large amount of contents without sacrificing the ease of use.

The invention claimed is:

1. A data file browsing system for displaying image data composed of an array of pixel data, comprising:
   an image data dividing mechanism for dividing said image data in a direction perpendicular to the direction of reading said pixel data items to generate a plurality of divided image data items;
   a storing means for storing said divided image data items;
   a means for reading a desired portion from said divided image data items; said storing means; and
   an image displaying mechanism for combining and displaying said portion, wherein
   said image data is data obtained by converting, to image data, a plurality of markup language files having a hierarchical structure in terms of tag data,
   the image data as converted being arranged in the lateral direction in accordance with said hierarchical structure; and
   wherein said image displaying mechanism is used to scroll the image data in the lateral direction in accordance with said tag data; and
   wherein said markup language files are provided through the Internet as Web pages,
   wherein each of said image data arranged in the form of a two dimensional array is associated with a link to an address in the Internet where is provided the original markup language file before conversion, and
   wherein said Web page can be accessed by clicking the respective image data as arranged in the form of the two dimensional array.

2. The data file browsing system as claimed in claim 1 further comprising a temporary storage means for storing the image portion and outputting to said image displaying mechanism.

3. The data file browsing system as claimed in claim 2 wherein said temporary storage means is in a predetermined area of a memory device.

4. The data file browsing system as claimed in claim 3 wherein there are more than one such predetermined area in said memory device.

5. The data file browsing system as claimed in claim 4 wherein the size of said predetermined storage region is variable depending upon the number of divided image data items being read.

6. The data file browsing system as claimed in claim 1 wherein said system is provided with a bookmark function for recording a current position by adding tag data when the image data is scrolled.

7. The data file browsing system as claimed in claim 1 further comprising
   a fixed cursor to be fixedly displayed in a predetermined position in a display screen window;
   a coordinates obtaining mechanism for obtaining the coordinates in the screen window as specified by the fixed cursor; and
   a console device for inputting the direction in which said fixed cursor is moved, wherein
   said image displaying mechanism is used to scroll said image data to the direction opposite to the direction as input through the console device.

8. The data file browsing system as claimed in claim 1 further comprising
   a region selecting mechanism with which an arbitrary region can be designated on the image displayed in said image displaying mechanism; and
   a record file outputting mechanism for including the images as designated in a record file and outputting, to said record file, designated region specifying data for specifying the divided image data items included in the region as designated by said region selecting mechanism.

9. The data file browsing system as claimed in claim 8 further comprising
   a substitute data generating mechanism for generating, when the divided image data item included in said record file is deleted, a new image data file corresponding to the image portions of said divided image data items in order that the image data file generated anew is associated with said designated region specifying data.

10. The data file browsing system as claimed in claim 1 wherein
said image data is generated by converting pages of a publication to image data items.

11. The data file browsing system as claimed in claim 10 wherein
the coordinate information of said divided image data items is associated with pages and line numbers of the publication.

12. The data file browsing system as claimed in claim 10 wherein
said publication includes is a program schedule of television or radio broadcasting while the coordinate information of said divided image data items is associated with channels and time of the program schedule.

13. The data file browsing system as claimed in claim 10 wherein
said publication is a catalog in which the coordinate information of said divided image data items is associated with the page numbers of the catalog in order to specify a particular item in the catalog with reference to the page number and the associated coordinates.

14. The data file browsing system as claimed in claim 1 wherein
said divided image data item is used to demonstrate a full-motion video by sequentially displaying a plurality of divided image data items, and
said system is provided with a full-motion video handling mechanism for specifying or modifying the displaying order of said plurality of the divided image data items.

15. The data file browsing system as claimed in claim 14 wherein
said motion picture handling mechanism is a pointing device including a touch panel and a mouse while said displaying order and the speed of display can be adjusted by controlling the moving direction or speed of said pointing device.

16. The data file browsing system as claimed in claim 1 wherein
said image data is provided for displaying a wide area such as a map, a celestial image and so forth while said divided image data items represent sub regions of said wide area;
said image displaying mechanism has a function for displaying predetermined dummy data in display areas in which no divided image data item is available.

* * * * *